Sept. 4, 1951 J. M. CUNNINGHAM ET AL 2,566,931
RECORD CARD PUNCHING MACHINE
Filed Nov. 23, 1948 23 Sheets-Sheet 1

INVENTORS
JAMES M. CUNNINGHAM
ARTHUR F. SMITH
BY William Lang
ATTORNEY

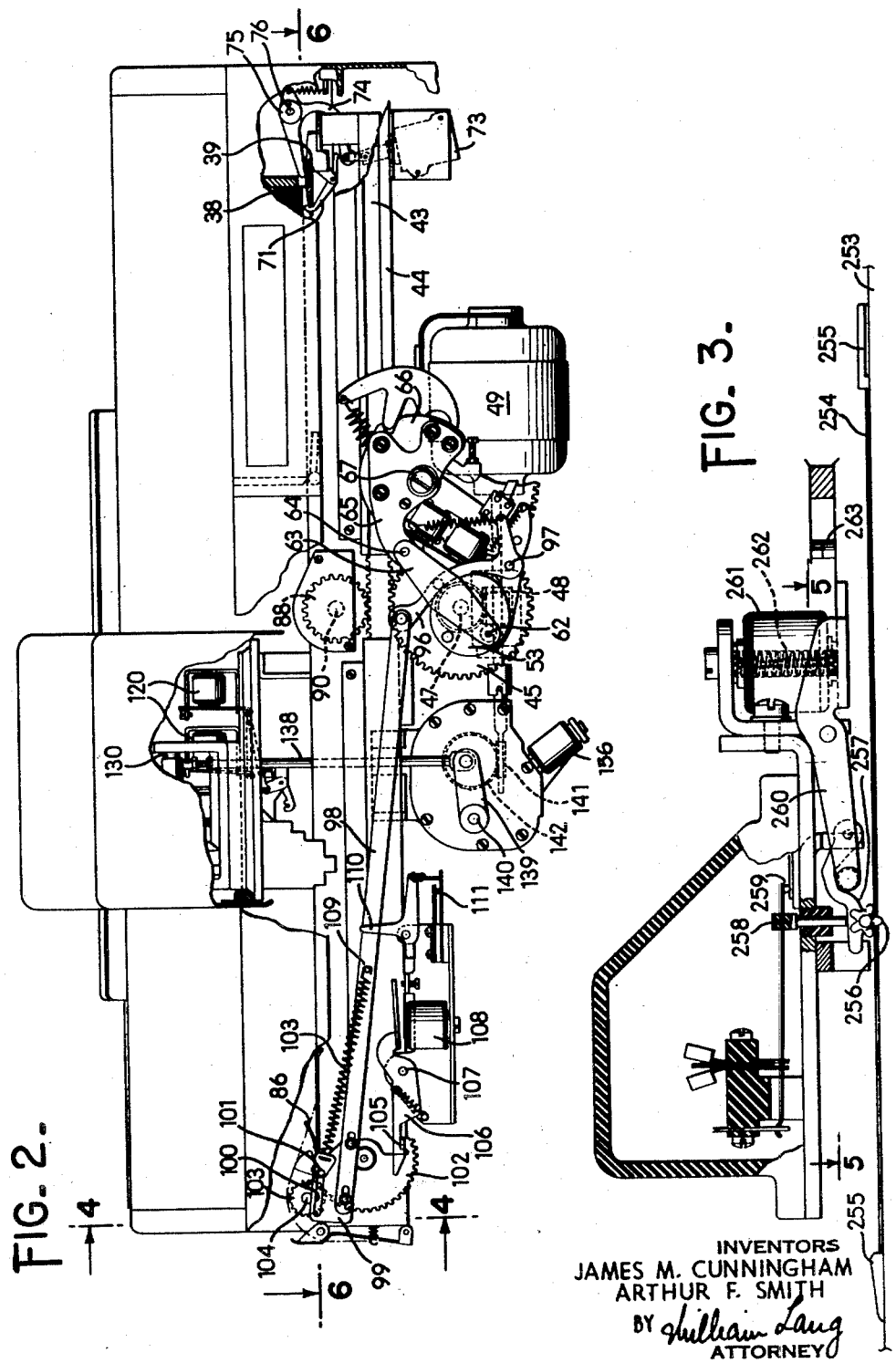
Sept. 4, 1951   J. M. CUNNINGHAM ET AL   2,566,931
RECORD CARD PUNCHING MACHINE
Filed Nov. 23, 1948   23 Sheets-Sheet 2
INVENTORS
JAMES M. CUNNINGHAM
ARTHUR F. SMITH
BY
ATTORNEY Sept. 4, 1951   J. M. CUNNINGHAM ET AL   2,566,931
RECORD CARD PUNCHING MACHINE Filed Nov. 23, 1948   23 Sheets-Sheet 3

INVENTORS
JAMES M. CUNNINGHAM
ARTHUR F. SMITH
BY William Lang
ATTORNEY

Sept. 4, 1951 J. M. CUNNINGHAM ET AL 2,566,931
RECORD CARD PUNCHING MACHINE
Filed Nov. 23, 1948 23 Sheets-Sheet 4

INVENTOR
JAMES M. CUNNIGHAM
ARTHUR F. SMITH
BY William Lang
ATTORNEY

Sept. 4, 1951  J. M. CUNNINGHAM ET AL  2,566,931
RECORD CARD PUNCHING MACHINE
Filed Nov. 23, 1948  23 Sheets-Sheet 5
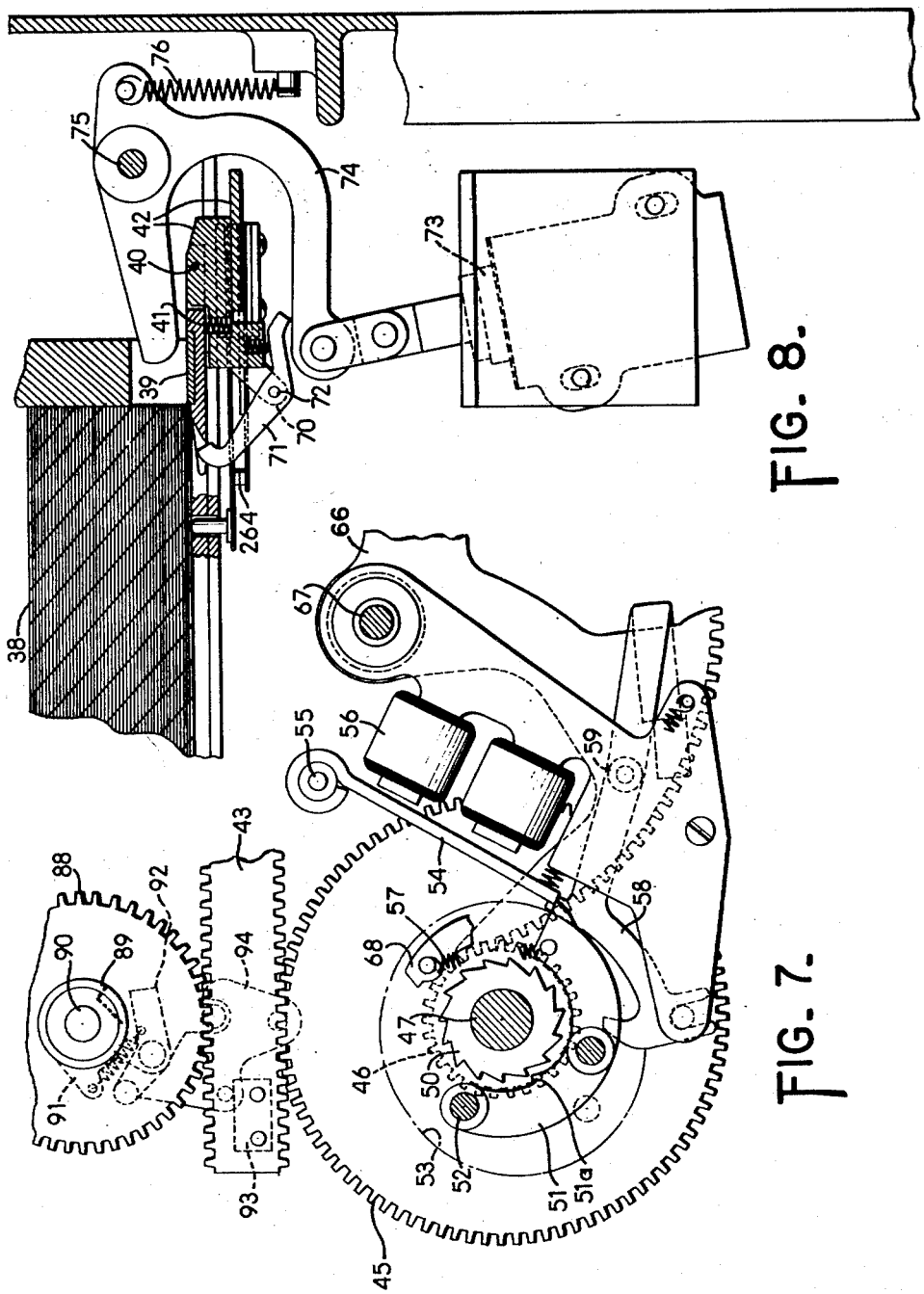
INVENTORS
JAMES M. CUNNINGHAM
ARTHUR F. SMITH
BY *William Lang*
ATTORNEY

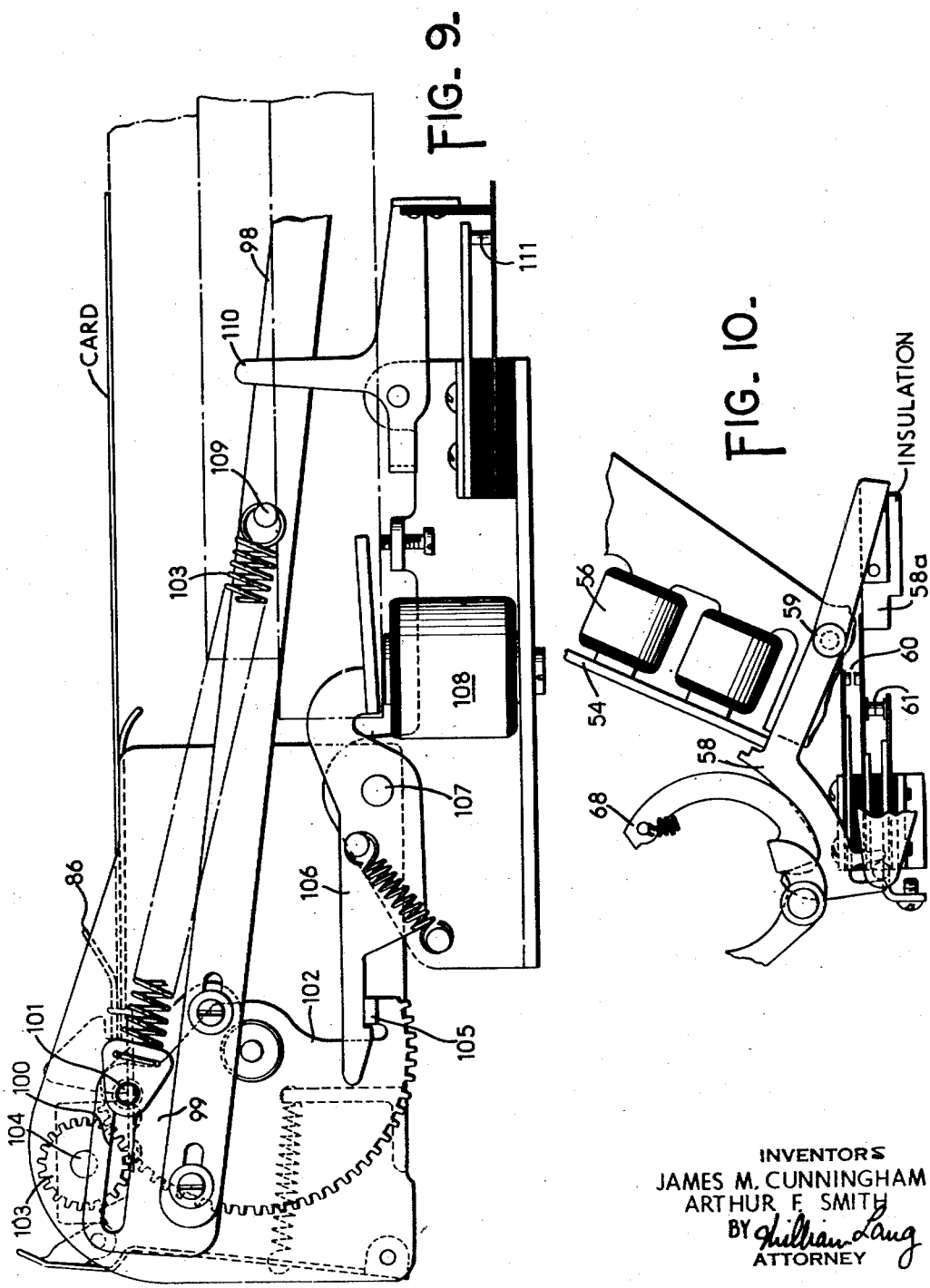

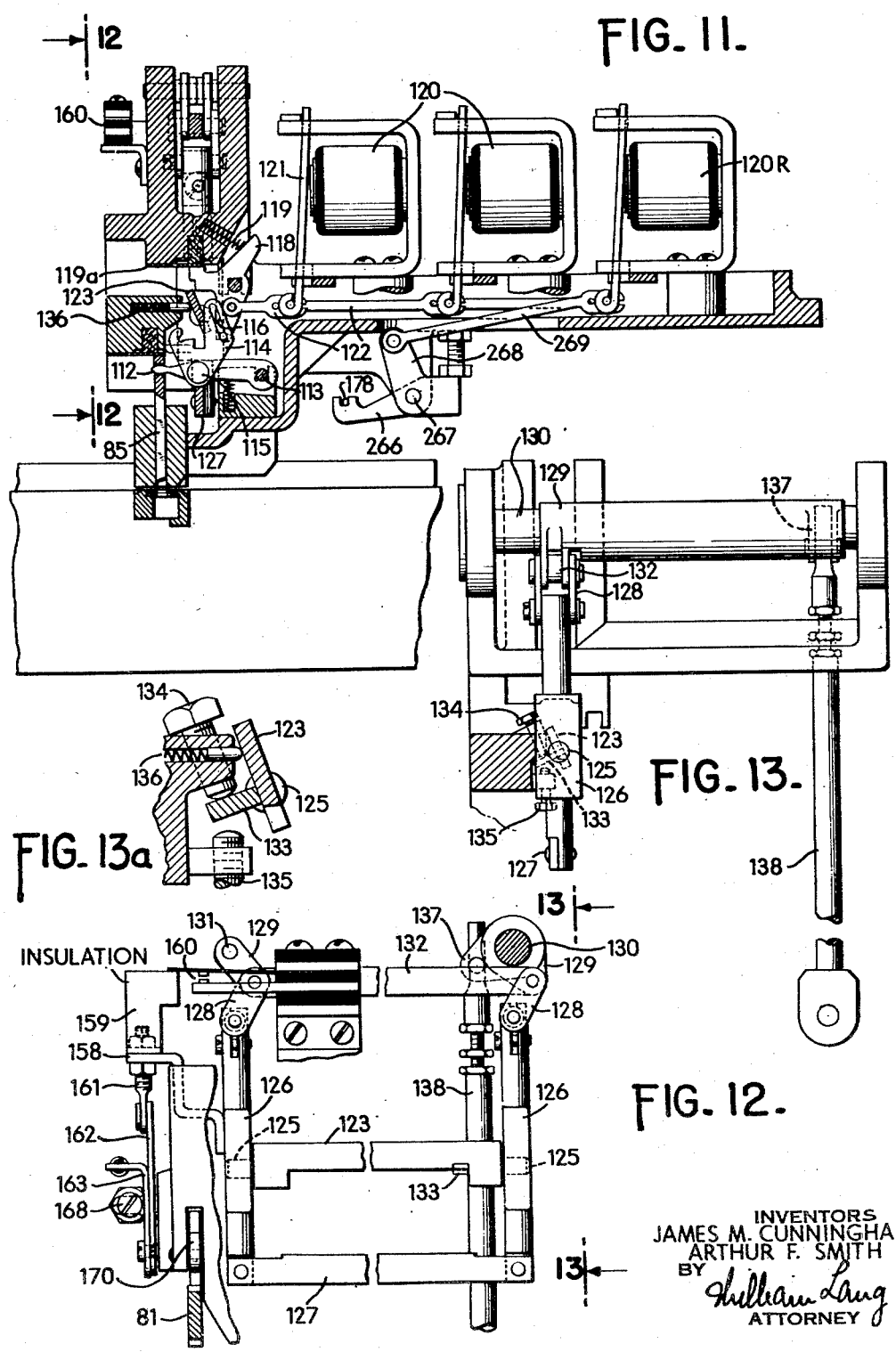

Sept. 4, 1951  J. M. CUNNINGHAM ET AL  2,566,931
RECORD CARD PUNCHING MACHINE
Filed Nov. 23, 1948  23 Sheets-Sheet 8

INVENTORS
JAMES M. CUNNINGHAM
ARTHUR F. SMITH
BY William Lang
ATTORNEY

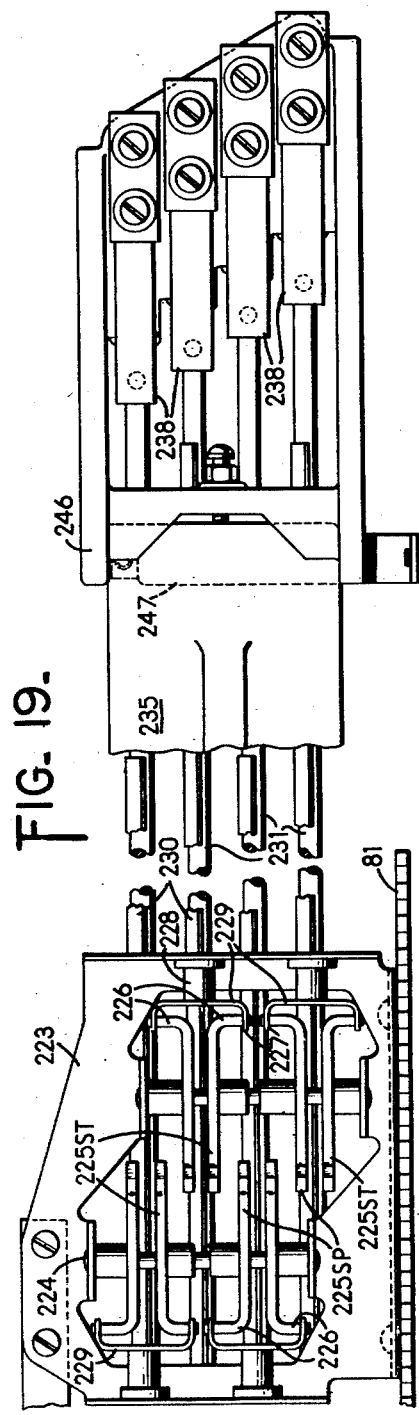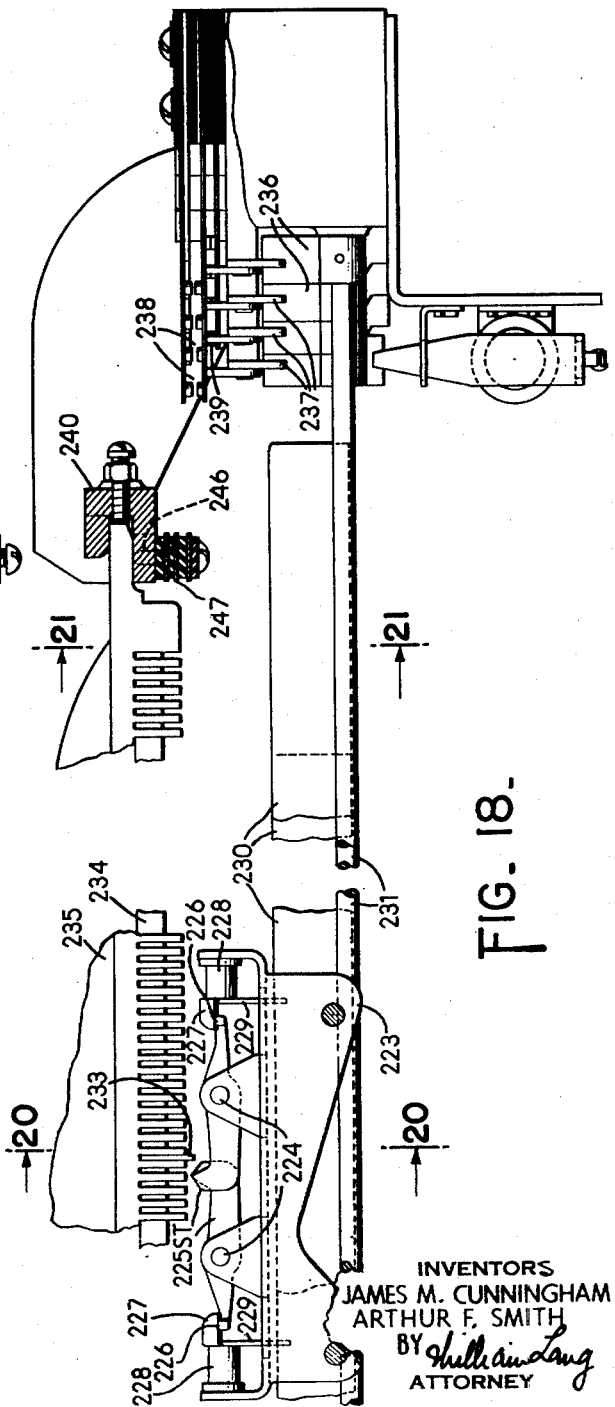

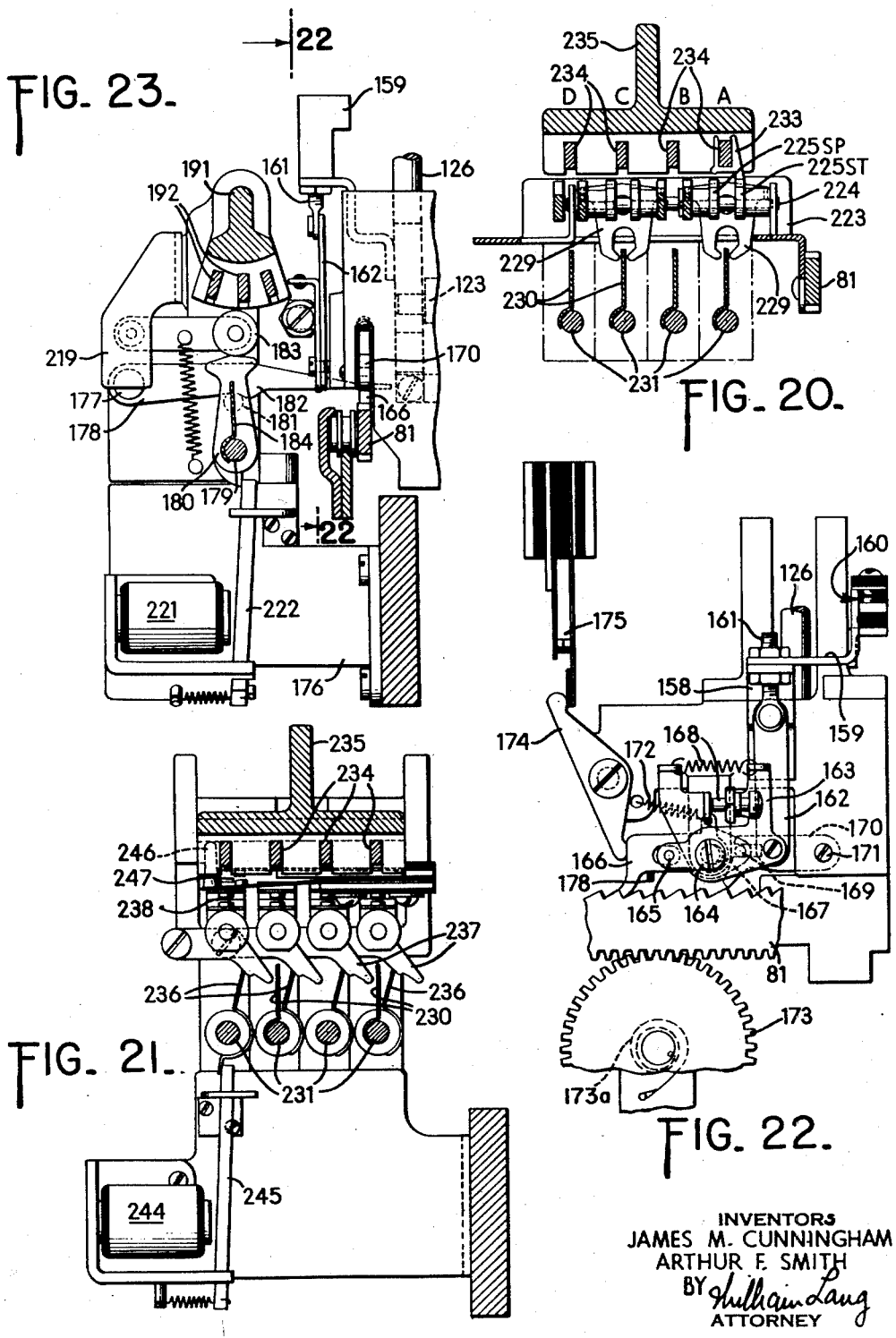

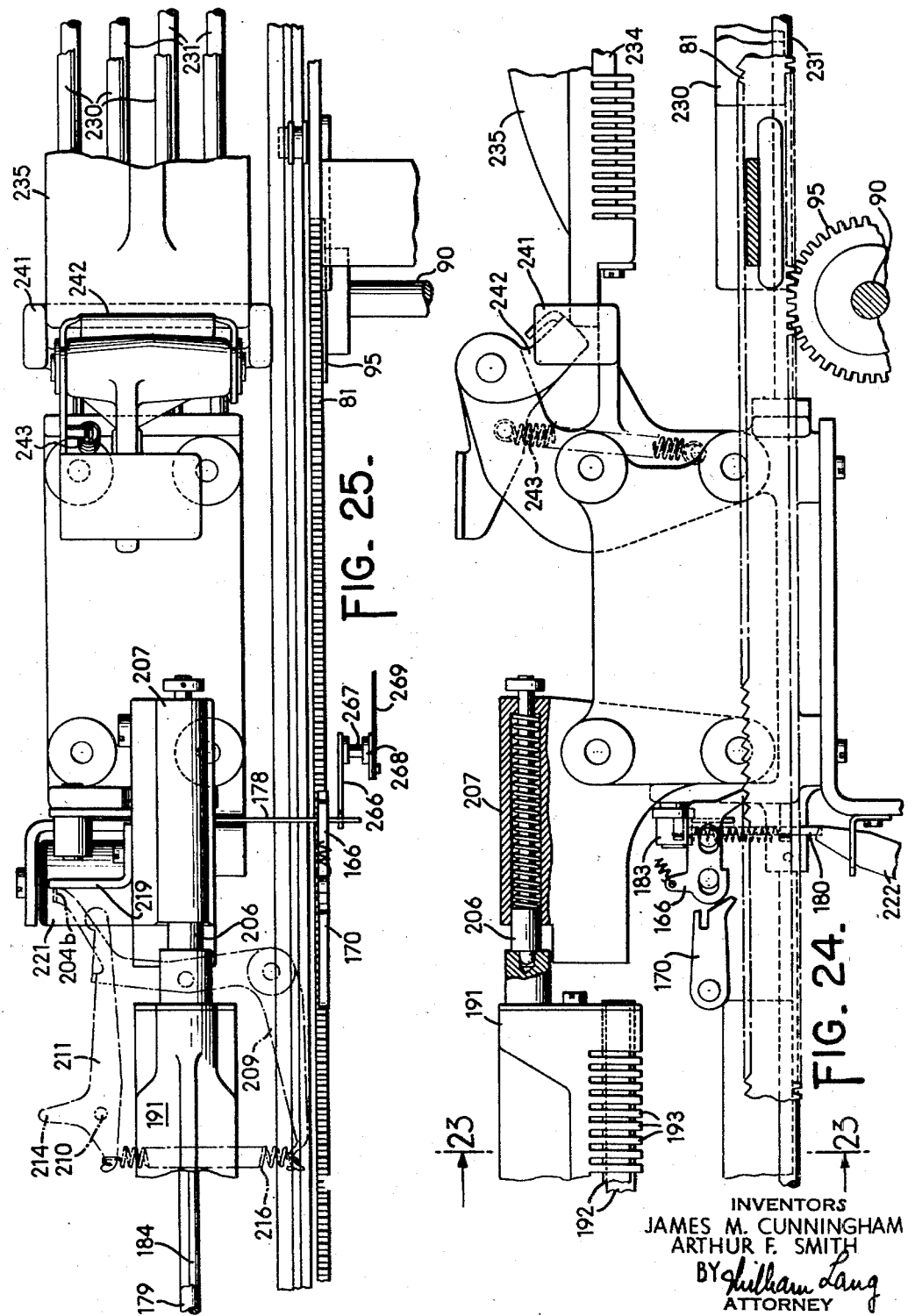

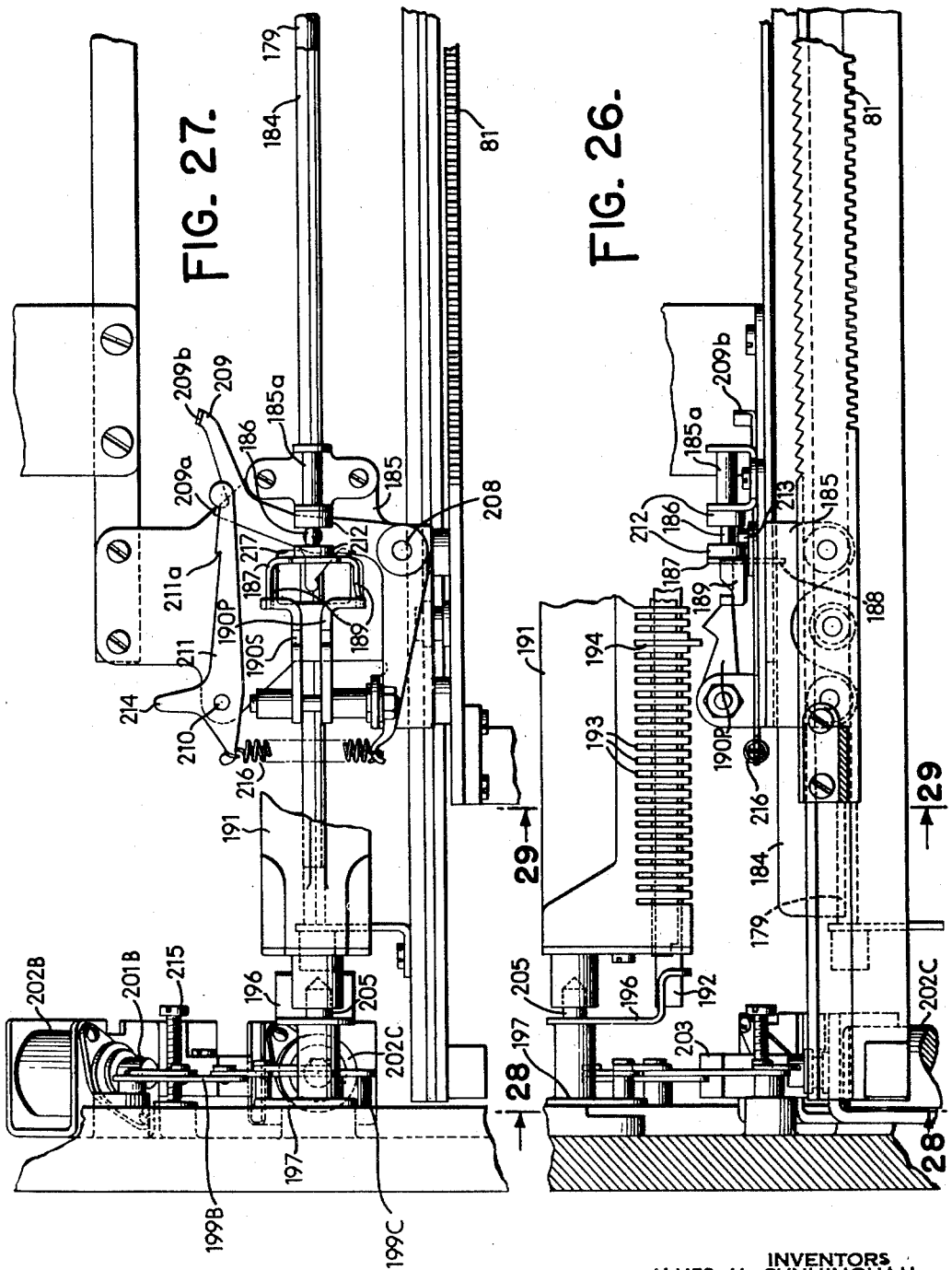

Sept. 4, 1951   J. M. CUNNINGHAM ET AL   2,566,931
RECORD CARD PUNCHING MACHINE

Filed Nov. 23, 1948   23 Sheets-Sheet 13

INVENTORS
JAMES M. CUNNINGHAM
ARTHUR F. SMITH
BY *William Lang*
ATTORNEY

Sept. 4, 1951  J. M. CUNNINGHAM ET AL  2,566,931
RECORD CARD PUNCHING MACHINE

Filed Nov. 23, 1948  23 Sheets-Sheet 14

INVENTORS
JAMES M. CUNNINGHAM
ARTHUR F. SMITH
BY William Lang
ATTORNEY

Sept. 4, 1951　　　J. M. CUNNINGHAM ET AL　　　2,566,931
RECORD CARD PUNCHING MACHINE

Filed Nov. 23, 1948　　　　　　　　　　　23 Sheets-Sheet 15

INVENTORS
JAMES M. CUNNINGHAM
ARTHUR F. SMITH
BY William Lang
ATTORNEY

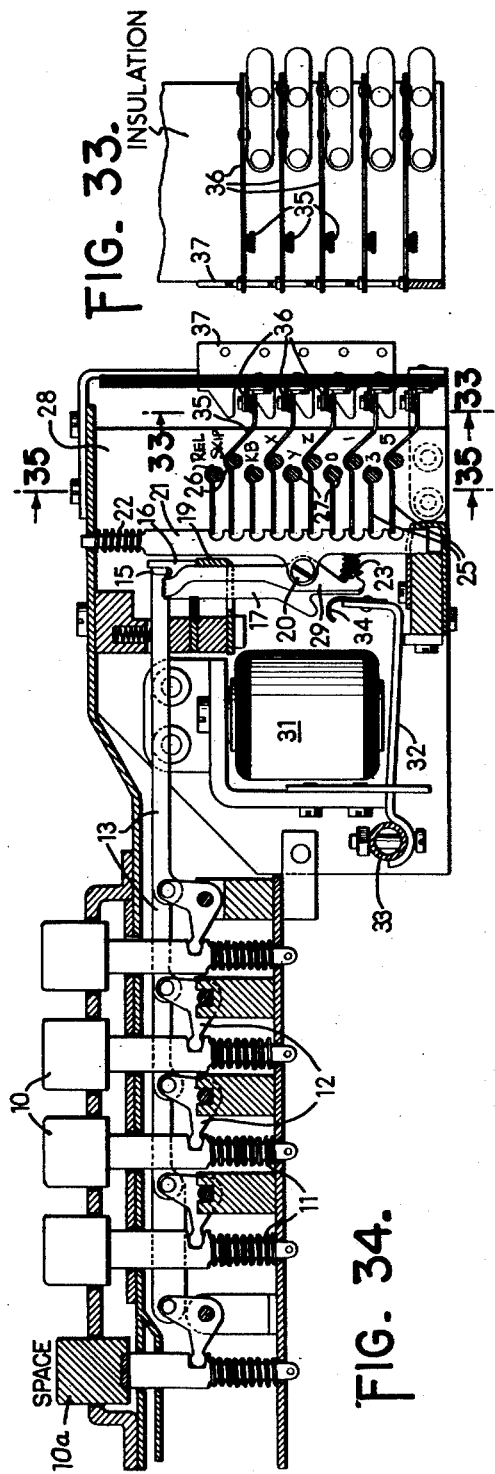
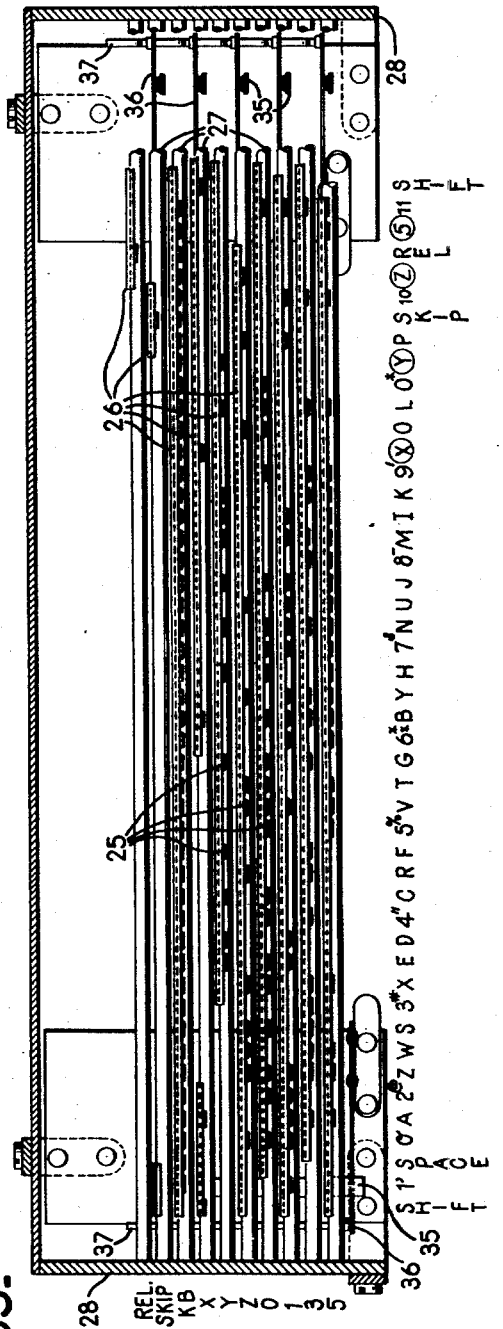

Sept. 4, 1951  J. M. CUNNINGHAM ET AL  2,566,931
RECORD CARD PUNCHING MACHINE

Filed Nov. 23, 1948  23 Sheets-Sheet 17

INVENTORS
JAMES M. CUNNINGHAM
ARTHUR F. SMITH
BY William Lang
ATTORNEY

Sept. 4, 1951   J. M. CUNNINGHAM ET AL   2,566,931
RECORD CARD PUNCHING MACHINE
Filed Nov. 23, 1948   23 Sheets-Sheet 18

INVENTORS
JAMES M. CUNNINGHAM
ARTHUR F. SMITH
BY William Lang
ATTORNEY

Sept. 4, 1951 J. M. CUNNINGHAM ET AL 2,566,931
RECORD CARD PUNCHING MACHINE
Filed Nov. 23, 1948 23 Sheets-Sheet 19
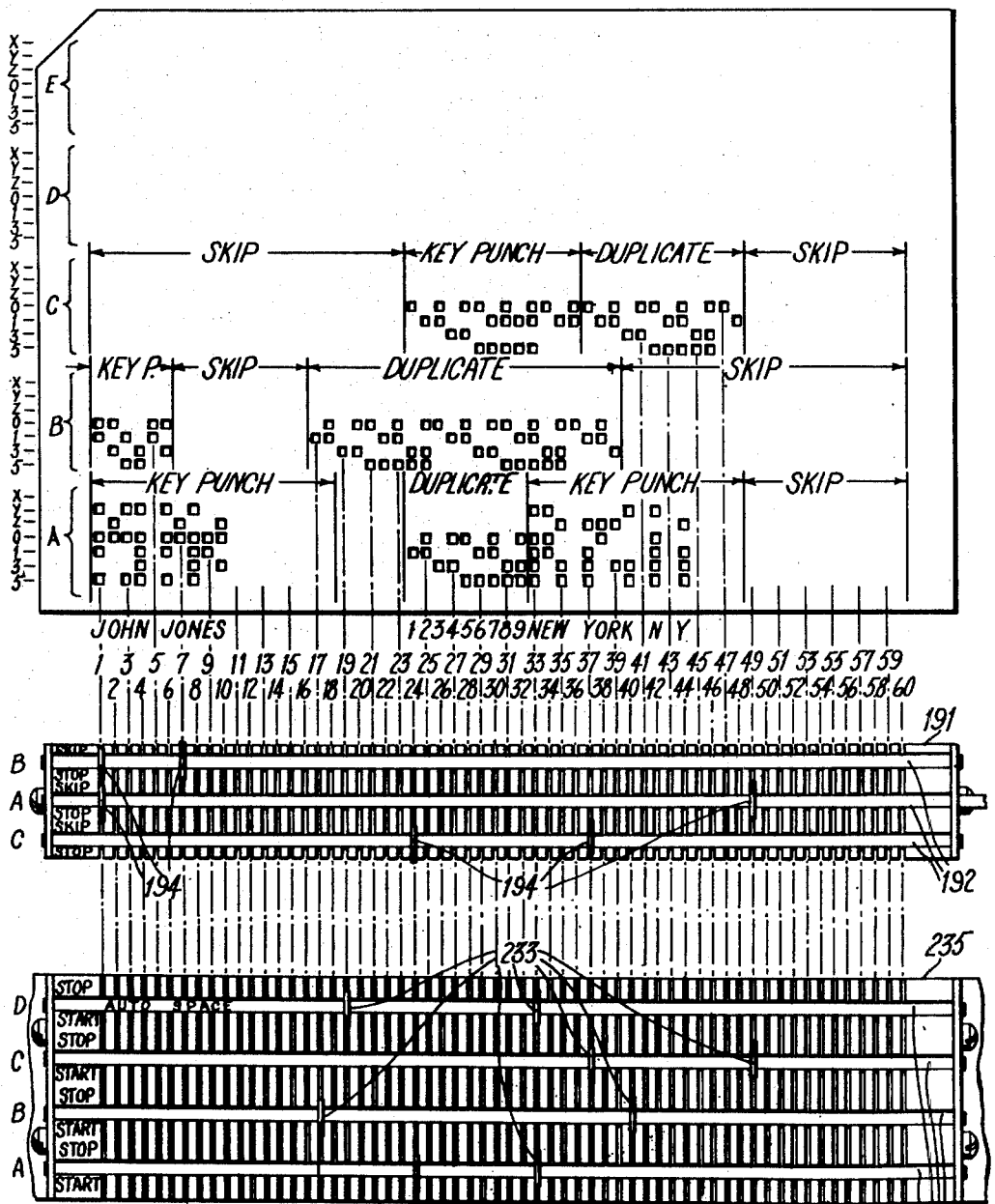
FIG._38_
INVENTORS
JAMES M. CUNNINGHAM
ARTHUR F. SMITH
BY William Lang
ATTORNEY

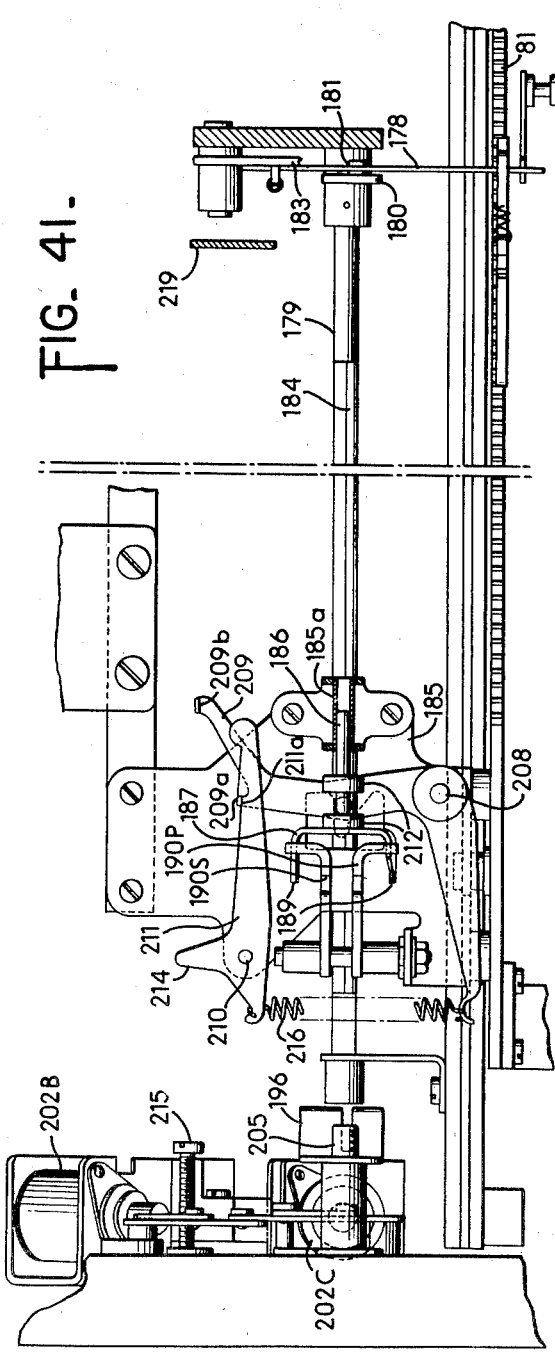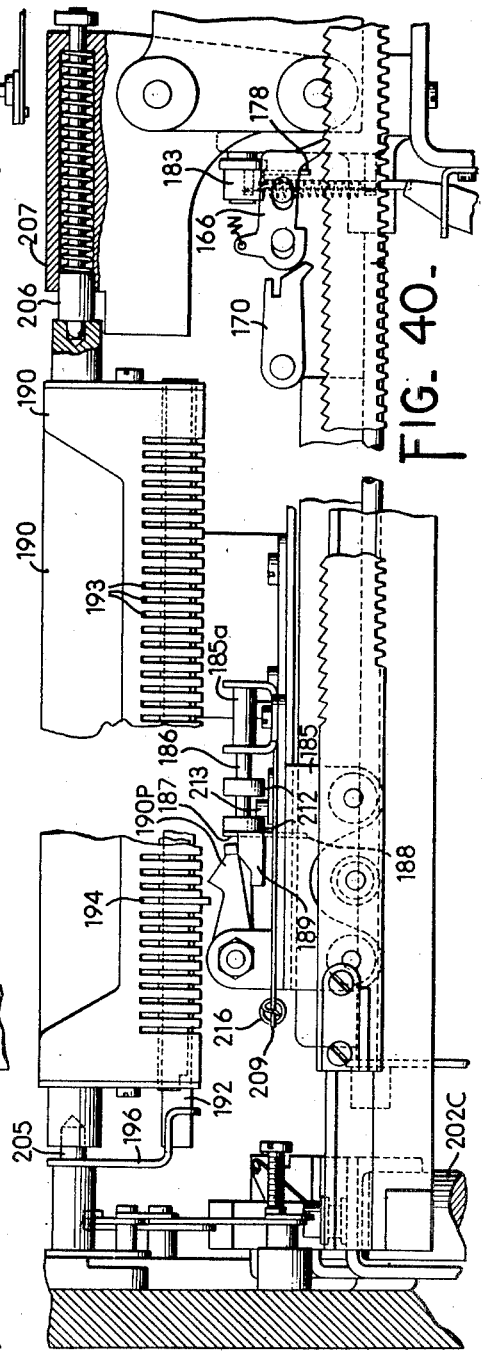

Patented Sept. 4, 1951

2,566,931

UNITED STATES PATENT OFFICE 2,566,931

RECORD CARD PUNCHING MACHINE

James M. Cunningham and Arthur F. Smith, Endicott, N. Y., assignors to International Business Machines Corporation, New York, N. Y., a corporation of New York Application November 23, 1948, Serial No. 61,662

24 Claims. (Cl. 164—113)

This invention relates to a key and/or pattern card operated punching machine for effecting data perforations in record cards.

The principal object of the invention is to provide a new and improved punching machine for punching so-called multideck record cards which are fed one by one from a supply hopper to and past a row of punches, step by step. Provision is made to punch key-set data in a first deck as the card passes the row of punches and, if data is to be punched in a second deck, the card is then retracted and fed past the row of punches a second time to receive data in the second deck. Similarly, if a third deck is to receive punching, the card is retracted for a second time and then fed past the punches to receive data in the third deck. The card is not shifted along its lesser dimension to punch the plurality of decks and a bank of punches extending across three decks, here twenty-one punches, is employed.

A pattern card is provided containing common data which is to be duplicated in each of the record cards. This pattern card causes punching of such data in the first deck when the stops are approximately set, and in either or both of the remaining decks during the passage of the card for key punching of the first deck. Where there is to be key punching in a column of the first deck and pattern card punching in the same column of another deck, both punchings occur together. Selectively settable controls are provided in accordance with whether cards are to be key punched in one, two or three decks to cause automatic retraction of the cards where more than one deck is to be punched, and to suspend feeding of a new card from the hopper under such circumstances. Provision is further made for setting up controls for the so-called column skipping, duplicating, and key punching conditions for each separate set, and these controls are brought into play during the operations involving the related decks.

Another object is to provide improved devices for controlling card feeding and ejecting operations, wherein automatic ejection of a card is suppressed, where more than one deck is to be punched, until all selected decks have been operated upon.

A still further object of the invention is to provide improved operating mechanism for the punches, which mechanism is motor driven and more positive in its operation than heretofore.

A further object is to provide skip setting devices which are readily removable for setting the skipping conditions in the separate card decks.

Provision is also made for automatically reversing the punched combinations to enable additional decks to be punched by feeding cards in inverted relationship to the punches.

A further object of the invention is to provide an improved punch mechanism in which a toggle device is utilized to effect a punching operation during movement of the toggle across dead center in one direction and to effect a second punch operation when the toggle returns across dead center in the opposite direction, thus utilizing a reciprocating device to obtain two punch operations for each reciprocation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a section looking in the direction of line 2—2 of Fig. 1 showing the arrangement of the card feed driving mechanism.

Fig. 3 is a section taken on line 3—3 of Fig. 4, showing the devices for sensing the master or pattern card.

Fig. 7 is an enlarged detail of the card feed clutch mechanism shown on an enlarged scale.

Fig. 8 is an enlarged detail section looking in the direction of line 8—8 of Fig. 6.

Fig. 9 is an enlarged detail looking in the direction of line 9—9 of Fig. 6.

Fig. 10 is a further detail of parts shown in Fig. 7.

Fig. 11 is a section through the card punching mechanism taken on line 11—11 of Fig. 1.

Fig. 12 is a view looking in the direction of line 12—12 of Fig. 11.

Fig. 13 is a view looking in the direction of line 13—13 of Fig. 12.

Fig. 13a is an enlarged detail of parts in Fig. 13.

Fig. 18 is an enlarged detail looking in the direction of line 18—18 of Fig. 6.

Fig. 19 is a plan view of parts shown in Fig. 18.

Fig. 20 is a section taken on line 20—20 of Fig. 18.

Fig. 21 is a section taken on line 21—21 of Fig. 18.

Fig. 22 is a section taken on line 22—22 of Fig. 23.

Fig. 23 is a section taken on line 23—23 of Fig. 24.

Fig. 24 is an enlarged view of parts shown looking in the direction of line 24—24 of Fig. 6.

Fig. 25 is a plan of the parts shown in Fig. 24.

Fig. 26 is an enlarged detail looking in the direction of line 26—26 of Fig. 6.

Fig. 27 is a plan view of the parts shown in Fig. 26.

Fig. 33 is a section taken on line 33—33 of Fig. 34.

Fig. 34 is a section taken on line 34—34 of Fig. 30.

Fig. 35 is a section taken on line 35—35 of Fig. 34 showing the combination selecting mechanism.

Fig. 38 is a diagram showing the relationship between the card columns and the skip setting devices.

Figure 39:
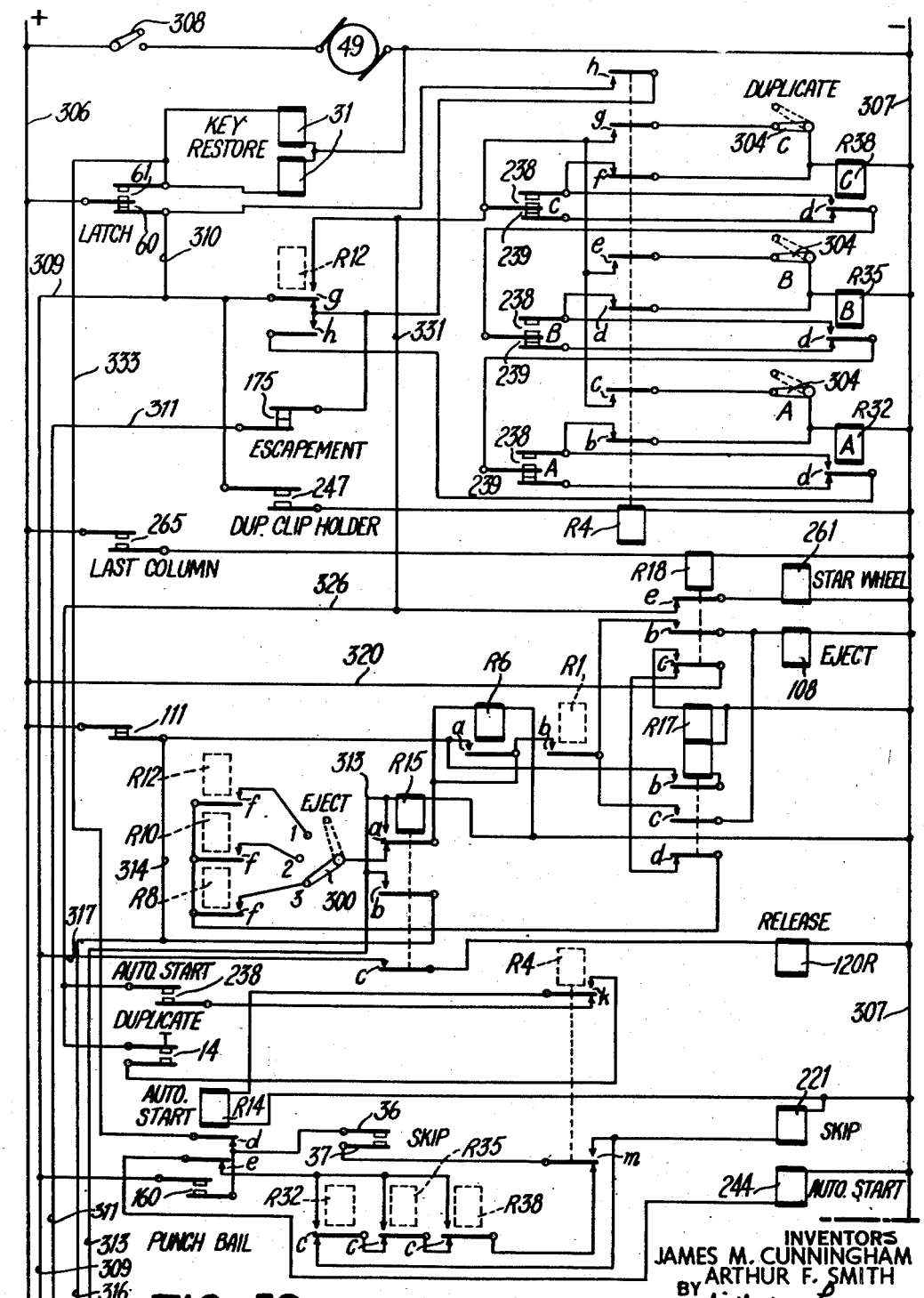
Figure 39A:
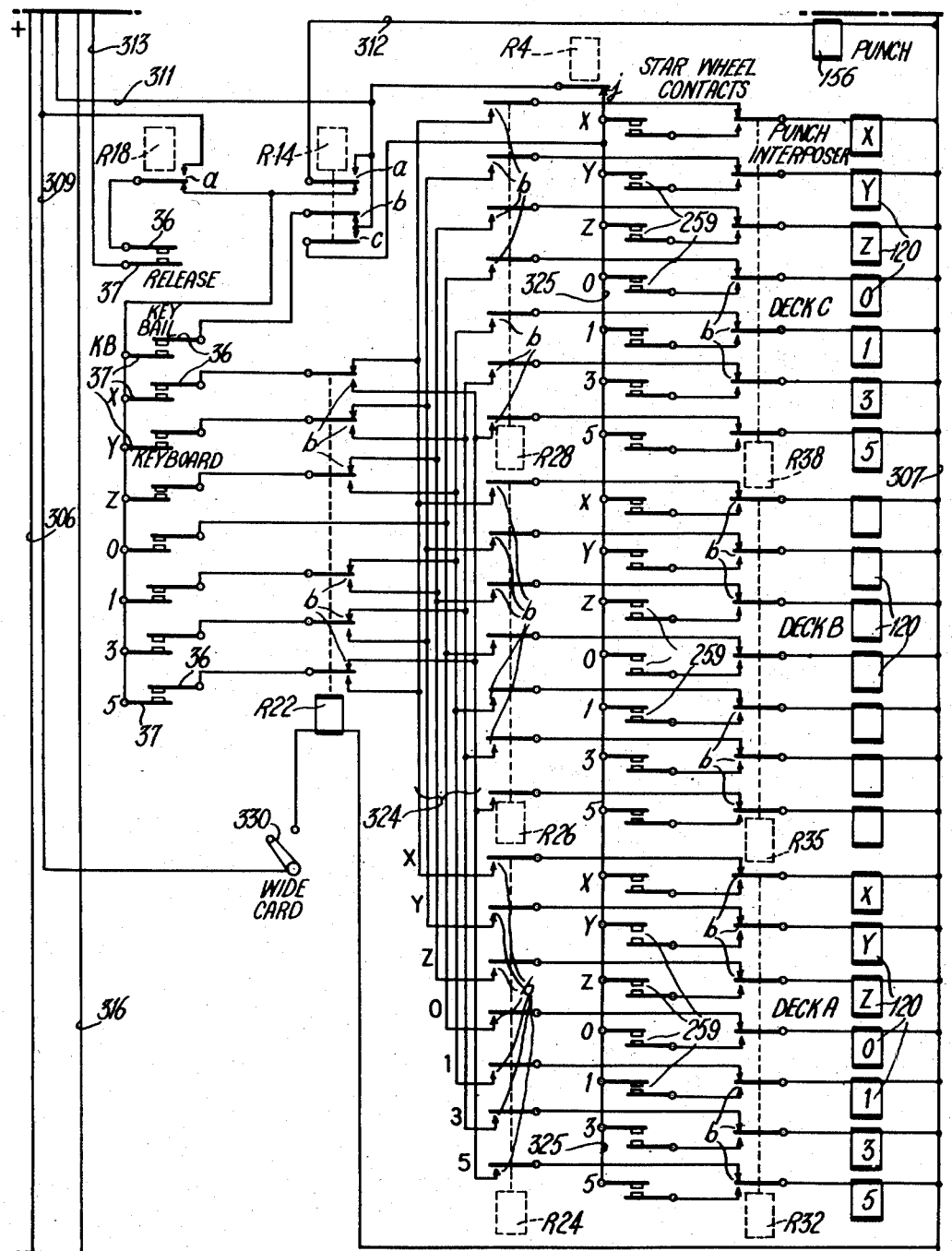
Figure 39B:
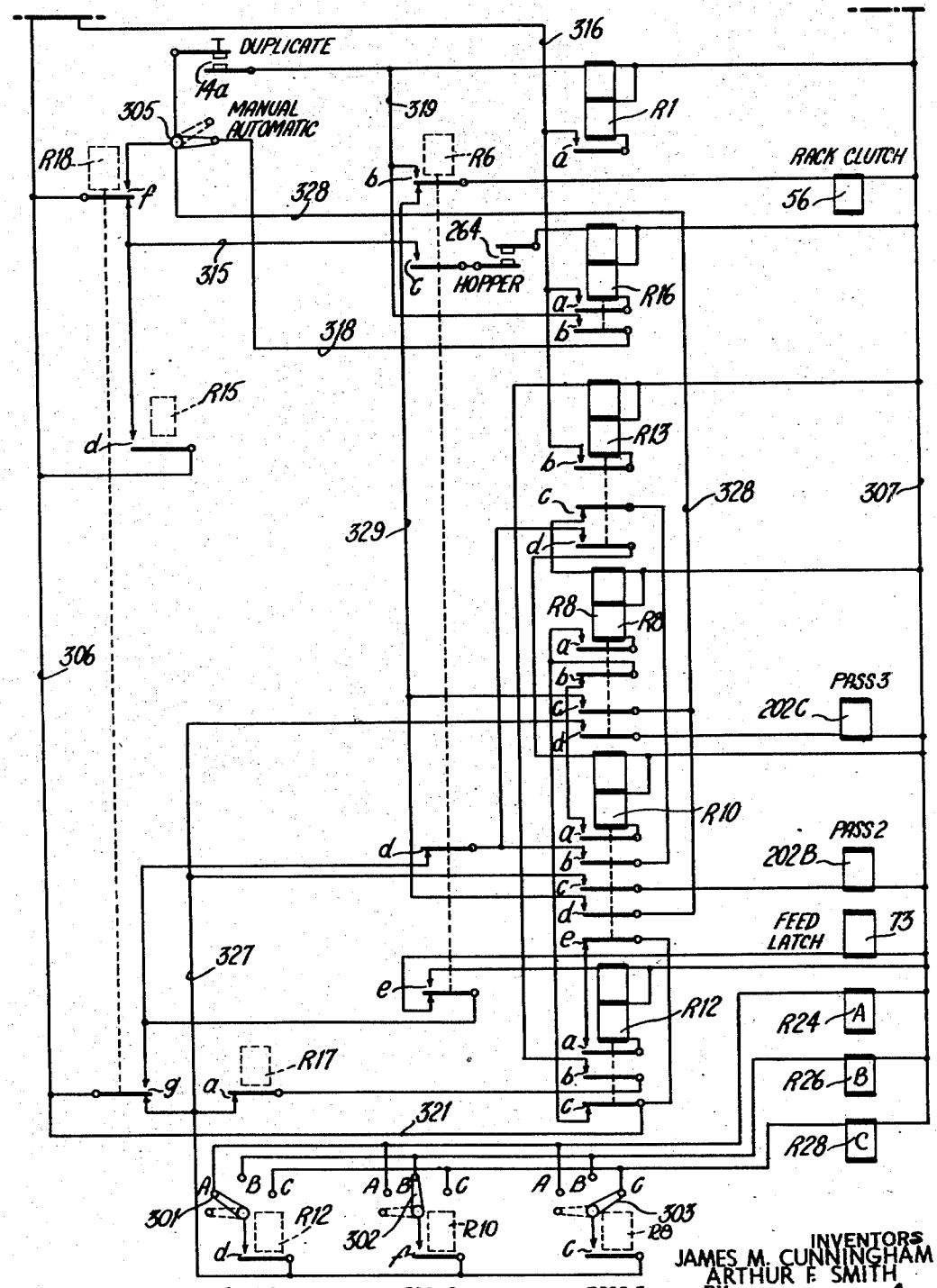

Figs. 39, 39a and 39b arranged vertically in the order named constitute a wiring diagram of the electric circuits of the machine.

Fig. 40 is a view similar to Fig. 26 with the parts in another position.

Fig. 41 is a plan view of Fig. 40 with the top elements removed.

The card

The record card which the machine is to punch is shown at the top of Fig. 38 where it is shown provided with five decks designated A, B, C, D and E, each of which has seven horizontal rows of punching positions designated X, Y, Z, 0, 1, 3, 5. The card is further provided with sixty vertical columns so that it will be seen provision is made for recording three hundred characters on this card. In the great majority of commercial applications, three decks are generally sufficient to record necessary data, as three decks of sixty columns each provide one hundred and eighty character recording positions. The machine is provided with a row of punches extending across the three lower decks A, B and C spaced to correspond to the punching positions on the card, that is, there are twenty-one punches.

The card is first moved past these punches and the set of seven punches related to a selected one of the three decks A, B or C is operated to punch data in this selected deck. The card is then retracted, preferably automatically, and moved past the punches a second time during which the group of seven punches related to either of the other two decks are operated to punch the desired data in its related deck, and finally after a second retraction the card is moved past the punches a third time, during which the set of punches related to the third deck is operated.

As usual in this type of machine, a master or pattern card is inserted in a suitable reading station and this card is provided with perforations which are to be duplicated in each of the cards moved past the row of punches. In the present machine, the arrangement is such that all data to be duplicated is punched in the blank card during the first movement thereof past the row of punches. This first movement is termed a "first pass" and will be so characterized hereinafter. The second movement is termed the second pass, and similarly the third movement is called the third pass, so that during the first pass of the cards all data obtained as a result of control by the pattern card is punched regardless of the deck in which it occurs. Thus, in Fig. 38 the three card fields designated "Duplicate" are punched during the first pass.

The perforations in the seven punching positions of the several decks are made in accordance with the following code.

| Character | X | Y | Z | 0 | 1 | 3 | 5 |
|---|---|---|---|---|---|---|---|
| 0 | | | | X | | | |
| 1 | | | | | X | | |
| 2 | | | | X | X | | |
| 3 | | | | | | X | |
| 4 | | | | X | | X | |
| 5 | | | | X | | | X |
| 6 | | | | | X | X | |
| 7 | | | | | X | | X |
| 8 | | | | X | | X | X |
| 9 | | | | X | | | |
| 10 | | | | | X | X | X |
| 11 | | | | X | X | X | X |
| ' (apostrophe) | X | | | | X | | |
| @ | X | | | X | X | | |
| # | X | | | | | X | |
| . | X | | | X | | X | |
| % | X | | | X | | | X |
| & | X | | | | X | X | |
| * | X | | | | X | | X |
| / | X | | | X | | X | X |
| A | X | | | | X | X | X |
| B | X | | | X | X | X | X |
| C | | X | | X | X | | |
| D | | X | | X | X | | |
| E | | X | | | X | X | |
| F | | X | | X | | X | |
| G | | X | | X | | | X |
| H | | X | | | X | X | |
| I | | X | | | X | | X |
| J | | X | | X | | X | X |
| K | | X | | | X | X | X |
| L | | X | | X | X | X | X |
| M | | X | | X | X | | |
| N | | X | | X | X | X | X |
| O | | | X | X | | | |
| P | | | X | X | X | | |
| Q | | | X | X | | X | |
| R | | | X | X | | | X |
| S | | | X | | X | X | |
| T | | | X | X | X | | |
| U | | | X | | X | | X |
| V | | | X | X | | X | X |
| W | | | X | | X | X | X |
| X | | | X | | X | | |
| Y | | | X | X | X | X | X |
| Z | | | X | X | | X | X |

Where additional punching is required in the D and E decks, the cards are fed through the machine in a separate operation but inverted to feed face down, and the set of punches in each deck is operated invertedly, that is, the X punch is operated to record in the 5 position, the Y punch is operated to record in the 3 position, and the Z punch is operated to record in the 1 position and so on. When duplicating, this is accomplished by also inverting the pattern card.

In the following, the mechanical units of the machine will first be described to explain their organization and operation, and following this there will be given a description of the circuit diagram which will set forth the sequence in which the operations occur for the specific example of Fig. 38.

*Alphabetic keyboard*

Figure 1:
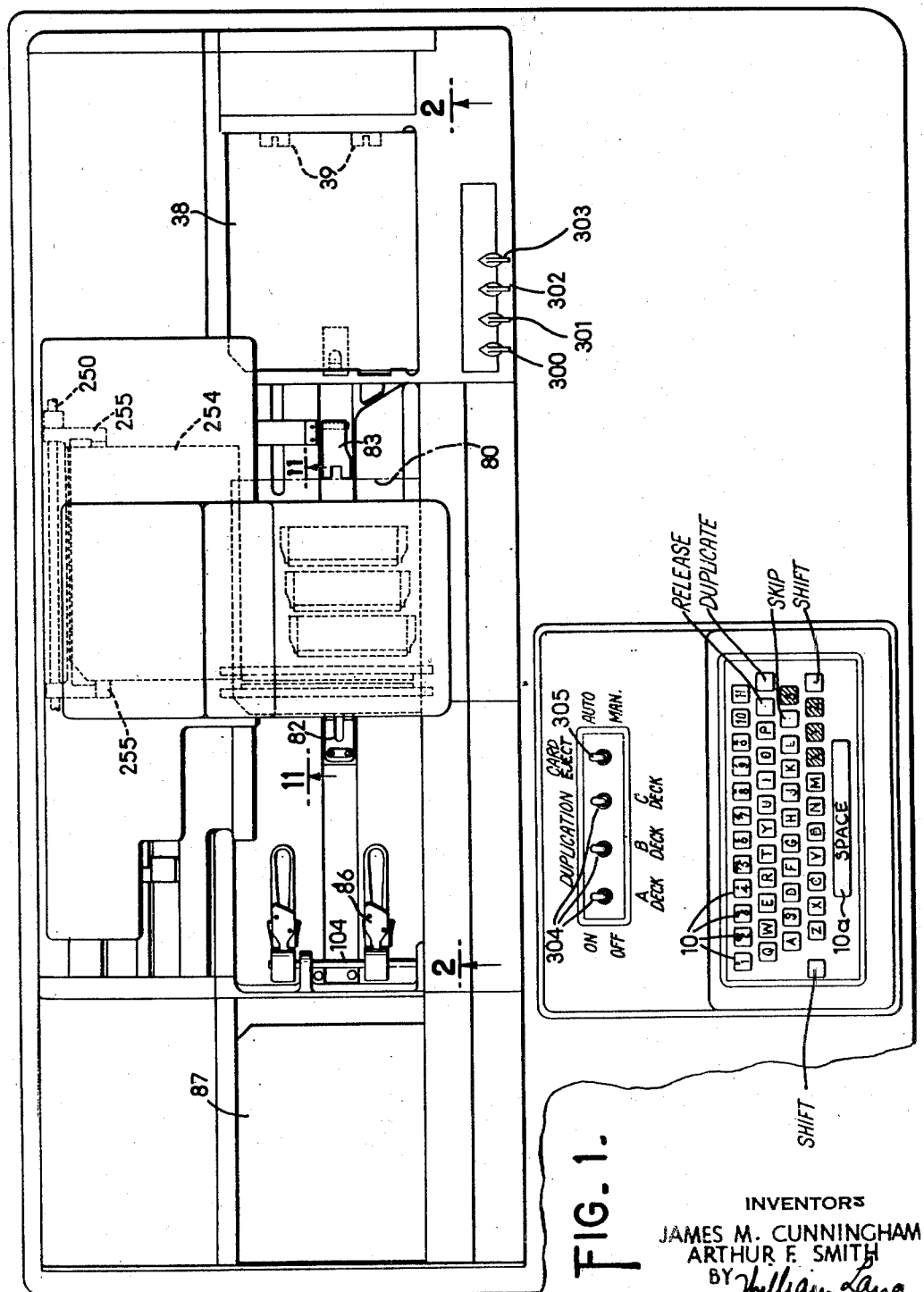
Fig. 1 is a plan view of the apparatus showing the location of the several units.
Figure 30:
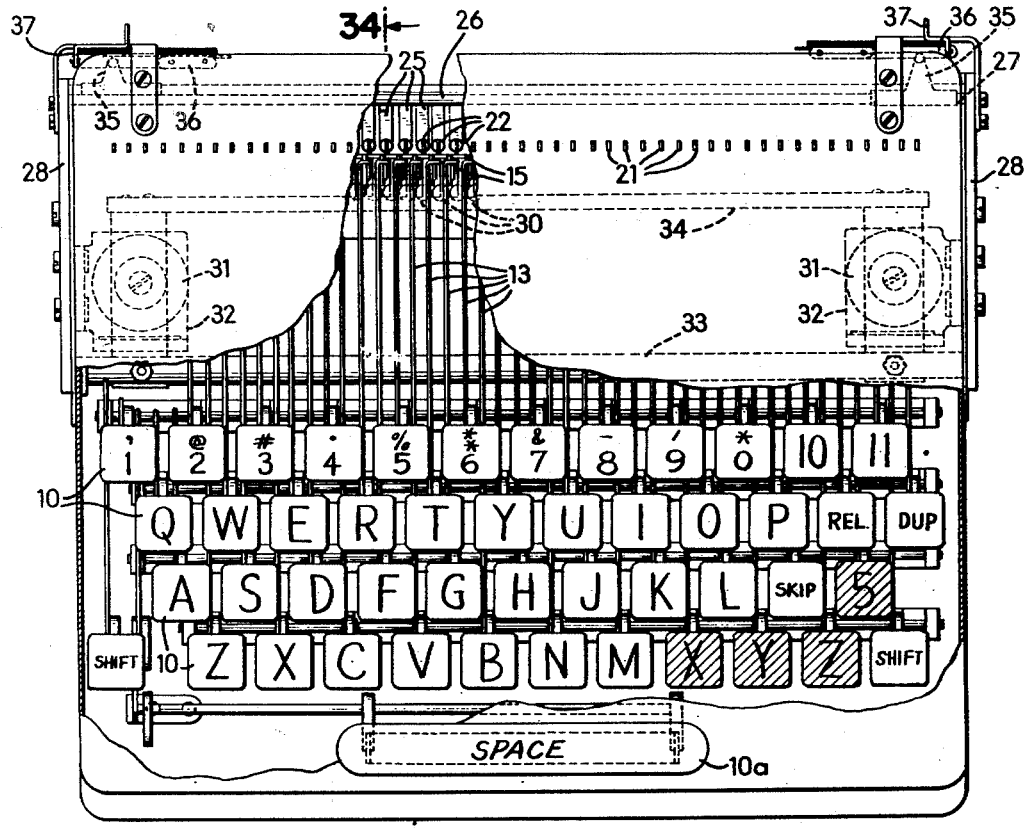
Fig. 30 is a plan view of the alphabetic keyboard with the casing partly broken away to show the interior mechanism.

The keyboard is shown in the lower part of Fig. 1 and in Fig. 30 with the keys 10 arranged in a conventional manner for operation by a typist. Additional keys designated Rel, Dup, Skip, 5, X, Y and Z are provided in the lower right hand corner with the four last named keys shaded to distinguish them from similarly identified keys in the conventional group.

Referring to Fig. 34, each key 10 is suitably supported for vertical movement and is normally biased upwardly by a spring 11. When depressed, key 10 will rock a bell crank lever 12 to draw a connected link 13 toward the left. The space key 10a has a similar bell crank connection to a link 13, so that all of the keys when operated will actuate a related link 13 with the exception of the Duplicate key 10 which, as diagrammatically indicated in Fig. 39, closes a pair of contacts 14 when depressed.

Figures 31, 32:
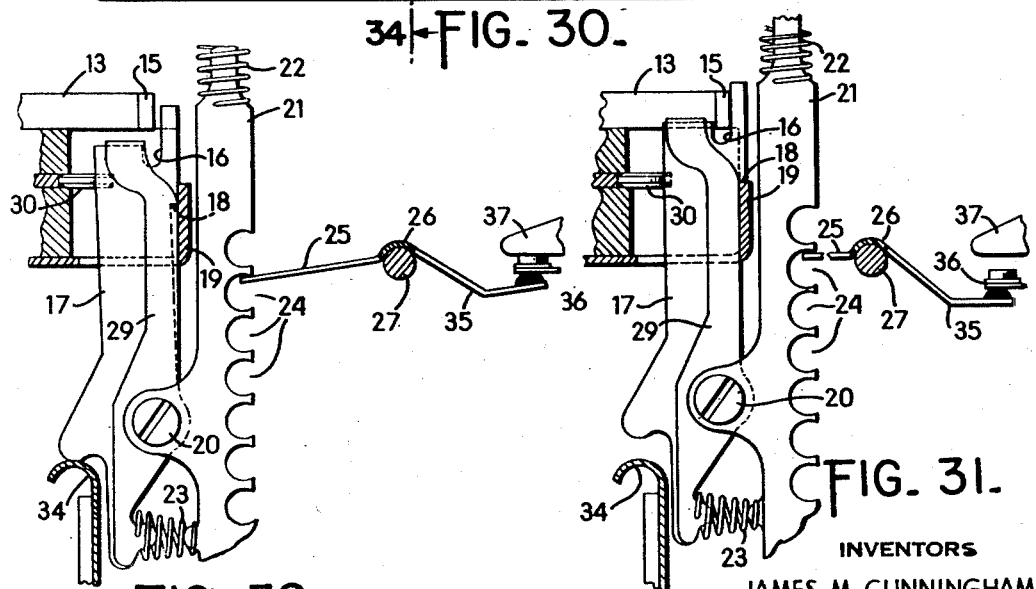
Fig. 31 is an enlarged detail of part of the key operated selecting mechanism.
Fig. 32 shows the parts in Fig. 31 in another position.

Each link 13 has a right angle extension 15 (Fig. 30) at its free end normally lying in a notch 16 of a latch 17 (see Fig. 31). This latch has a shoulder 18 resting upon a stationary cross bar 19 and is pivoted at 20 to a vertical slide 21. Thus, as shown in Fig. 34, the latch 17 serves to hold slide 21 in its upper position against the action of a spring 22.

Operation of any key 10 or 10a (except the Duplicate key) will shift its related link 13 to the left as viewed in Fig. 31 and the latter will engage one side of notch 16 to rock latch 17 counterclockwise out of engagement with bar 19. Thereupon, spring 22 will drive slide 21 down to the position of Fig. 32 with shoulder 18 of the latch passing to the left of bar 19 and bearing against it due to the influence of a spring 23 compressed between slide 21 and latch 17.

The slides 21 are all provided with a series of notches 24 into which the fingers 25 of a set of ten plates 26 extend. Each plate is integral with a rod 27 (Fig. 35) mounted for oscillation in end plates 28. Thus, when a slide 21 is lowered it will through engagement of the upper edge of its notch or notches cause one or more fingers 25 to rock the related rods 27. In Fig. 35 the rods 27 are labeled 5, 3, 1, 0, Z, Y, X, KB, Skip and Rel and the fingers 25 are arranged combinationally so that, when a particular character key is operated, the rods 27 corresponding to the combination for that key, as set forth in the table above, will be rocked. For example, if the A key is operated, its slide 21 will engage fingers extending from the 5, 3, 1 and X rods to rock this combination. In the same manner the other characters will selectively rock the rods, and inspection of Fig. 35 will show that for each character the combination of rods 27 that is rocked will be in accordance with said table. For the special characters, such as asterisks, apostrophe, etc., the shift key is operated as in normal typing, and this rocks the X rod while the character key rocks the remainder of the required rods.

The KB (key bail) rod 27 has a finger 25 in all positions except Shift, so that when any slide 21 is operated, it will rock the KB rod 27 in addition to the code rods. The Skip and Release keys rock separate rods 27 similarly identified.

Referring to Figs. 31, 32 and 34, each slide 21 has pivoted at 20 and adjacent to its latch 17 a spring pressed lever 29 which, when the slide is lowered, will assume the position of Fig. 32 where its upper extremity extends slightly above the left edge of notch 16. This lever is to guard against an inadvertent repeat operation where the operator may hold the key depressed in such a position that, when latch 17 restores upwardly, it may be caught by extension 15 and held to the left. Lever 29 prevents this by elevating extension 15, if it is not in its restored position, and maintaining it out of the notch 16 until the notch and the extension are returned to the position of Fig. 31.

The latches 17 are interlocked by the well known type of interlocking disks 30 indicated in Figs. 30, 31 and 32 which allow only one latch to operate at a time with the exception of the ones related to the Shift keys, which are not interlocked.

Restoration of the slides is effected by a pair of magnets 31 (Figs. 30 and 34) whose armatures 32 secured to a rod 33, when attracted, will elevate a bail 34 to engage extensions of latches 17 and concurrently raise and rock the latches from the position of Fig. 32 to that of Fig. 31.

Each plate 26 and related rod 27 has a single, rearwardly extending finger 35 and these are arranged in two vertical rows near the extremities of the rods (Figs. 30 and 34) with alternate fingers at one end for more convenient spacing. Each finger 35 extends beneath an insulated contact blade 36 (Fig. 33) normally out of contact with a common conductor 37 so that, when a rod is rocked, the related finger 35 will shift its blade 36 into contact with common conductor 37. Accordingly, the contacts 36, 37 are closed in combinations corresponding to the combinational arrangement of fingers 25 in Fig. 35 and in the table above, and these contacts will close circuits to effect punching operations as will be explained hereinafter. The alphabetic keyboard described above is disclosed and claimed in our copending divisional application, Serial No. 234,802, filed July 2, 1951.

*Card handling mechanism*

Referring to Figs. 1, 2, 6, 7, 8, 10, cards to be punched are placed in a hopper 38 and from here they are fed singly from the bottom of the stack by the picker 39, which advances the card to the card carriage. The picker 39 (see Fig. 8) is pivoted at 40 on a plate 42 with spring 41 affording a light clockwise bias. This plate is bent at its forward end (Figs. 2 and 6) for attachment to the right end of a rack 43 which is guided for reciprocation in a suitable channel 44. The rack has teeth in its lower edge meshing with a gear 45 (Figs. 2 and 7), which gear is freely mounted on a shaft 47 and which has integral therewith a smaller gear 46.

Shaft 47 is driven through worm and wheel connection 48 (Fig. 2) by a motor 49 so that, when the motor is in operation, shaft 47 operates to rotate a clutch driving ratchet 50 (Fig. 7) which is pinned to the shaft. The type of clutch employed is substantially similar to that disclosed in Brand et al. Patent 2,333,461 granted November 2, 1943, and will accordingly be but generally explained herein.

In the plane of driving ratchet 50 is a dog 51 which is pivoted at 52 to a cam 53. The free end of the dog 51 normally abuts the end of an armature 54 which is pivoted at 55. When magnet 56 is energized, the armature 54 is attracted to the position of Fig. 10, thereby releasing the dog 51 (Fig. 7) for counterclockwise rotation about pivot 52 under the influence of a spring 57, whereupon the single tooth 51a of the dog will engage ratchet 50 and be rotated thereby in a counterclockwise direction.

The magnet armature 54 when in normal position (Fig. 7) engages a lever 58 pivoted at 59 to hold the lever in the position shown in Fig. 7, where it holds a pair of contacts 60 closed and another pair of contacts 61 open (Fig. 10). When magnet 56 is energized, it releases lever 58 so that the latter may rock from the position of Fig. 7 to that of Fig. 10, being urged to do so by the common blade of contacts 60, 61, acting on an extension 58a.

With coupling of the dog 51 and ratchet 50 effected as explained, cam 53 turns counterclockwise carrying with it a pin 62 to which there is pivoted a link 63 (Fig. 2). The opposite end of this link is pivoted at 64 to member 65 which has a yieldable connection with a sector 66 (Figs. 2 and 7) pivoted on stud 67. Sector 66 has teeth meshing with the gear 46, so that through the mechanism traced the gears 46 and 45 will be rotated counterclockwise and then back again while the cam 53 makes one complete revolution and in the same manner as set forth in greater detail in Patent No. 2,333,461 above referred to.

The cam 53 carries a finger 68 (Fig. 7) which, after the cam has made a half revolution, will engage the left end of lever 58 rocking it back to its position of Fig. 7 and reopening contacts 61 (Fig. 10). When the revolution of cam 53 is completed, the dog 51 engages the free end of armature 54 which is now in its non-attracted position, and as a result the tooth 51a is disengaged from the driving ratchet 50 and the parts are back in their starting position of Fig. 7.

It will be noted that during the first half revolution of cam 53 the sector 66 drives the gear 45 (Figs. 2 and 7) counterclockwise and then during the second half back to its initial position, and the gear 45 accordingly effects a reciprocation of rack 43 and picker 39 to advance a new card from hopper 38.

Referring to Figs. 2 and 8, the picker supporting plate 42 supports a bracket 70 for each picker 39 and to which a spring pressed latch 71 is pivoted at 72. This latch has its upper end extending into a slot cut into the front end of picker 39 and, when the picker is tilted counterclockwise about its pivot 40, the latch 71 will hold it tilted, to thereby permit the picker to reciprocate without advancing a card from the magazine. To tilt the pickers, there is provided a solenoid 73 which, when energized, will rock a U-shaped lever 74 secured to a rod 75 counterclockwise against its spring 76. There are two levers 74 (Fig. 6), one for each picker, and their lower arms serve to release latches 71 when the latter return to the right after an excursion with the pickers.

When the picker 39 is effective, it will advance a card from hopper 38 to the position designated 80 in Fig. 1, where it is received by the card carriage. This comprises a rack 81 (Fig. 6) suitably mounted for reciprocation, from which there extends the card stop 82 at the left end and a card pusher 83 at the right end. The pusher 83 is pivoted at 84 (Fig. 36) so that, as the card is moved from the hopper 38 toward the left, it will pass beneath the pusher 83 causing the latter to tilt and let the card pass by. When the trailing edge of the card has been advanced sufficiently, the pusher will rock down behind it and will thereafter serve to advance the card toward the left from the position of Fig. 1.

Figure 36:
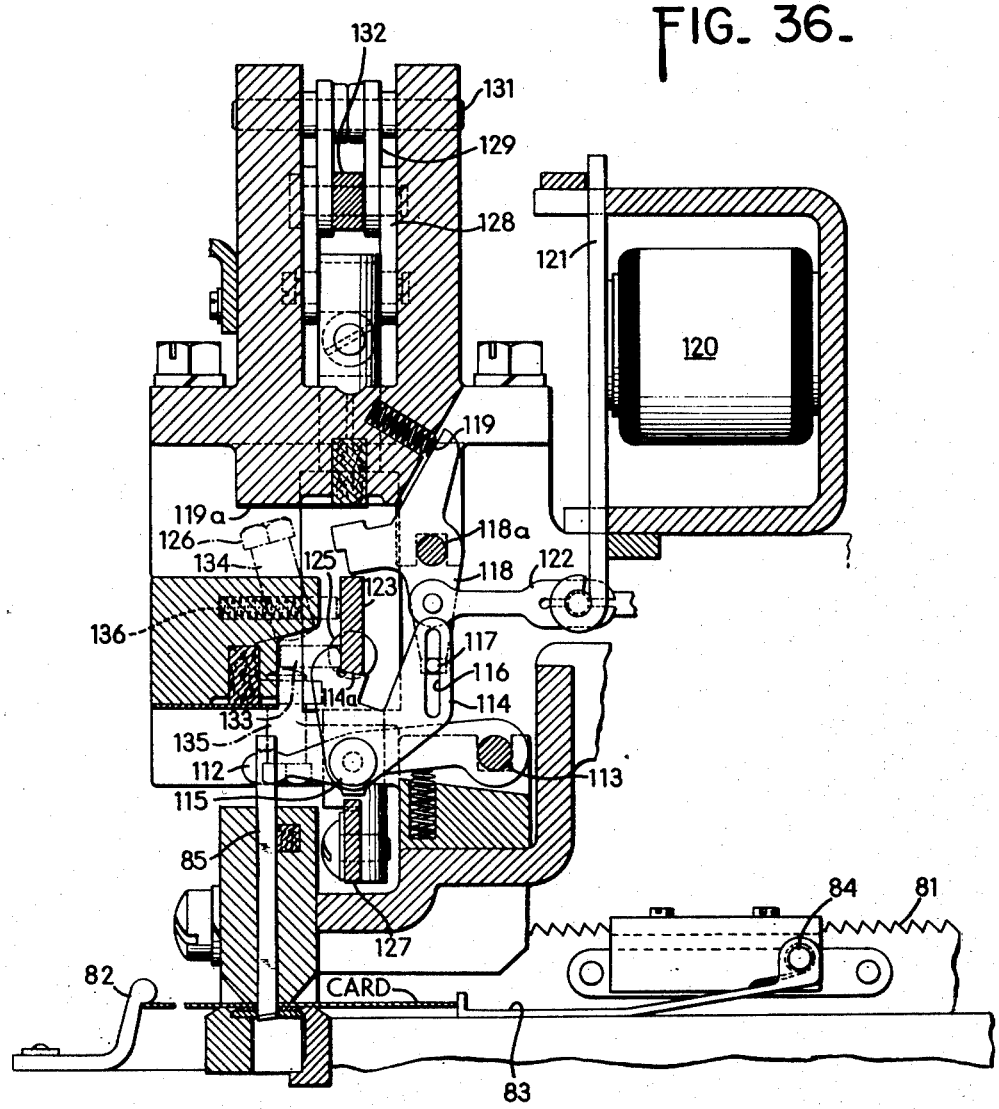
Fig. 36 is an enlarged view of the punching mechanism with the parts shown in operated position.

This advance toward the left, as will be explained, is effected step by step so as to present the columns of the card in succession to a row of punches 85 (Fig. 36). When the last column of the card is in punching position, the leading edge of the card will be between the jaws of the ejector generally designated 86 (Figs. 1, 6 and 9), which jaws serve to swing the card in a counterclockwise arc as viewed in Fig. 9 and deposit it in a hopper designated 87 (Fig. 1).

The manner in which the carriage is operated is as follows. The upper edge of rack 43 (Figs. 2 and 7) has teeth meshing with a gear 88 which is freely mounted on a cross shaft 90 and has secured thereto a cam 89, so that as rack 43 is reciprocated the gear 88 and cam 89 rotate first in a clockwise direction and then back again. Secured to shaft 90 is an arm 91 to which is pivoted a spring pressed dog 92. When rack 43 is in its right hand position, as viewed in Fig. 7, a block 93 riveted thereto engages and holds a cam lever 94 in the position shown where the lever engages the dog 92 to hold it out of engagement with the notch in cam 89. The action is such that, when rack 43 is moved to the left, gear 88 and cam 89 are rotated clockwise and block 93 moves away from and allows lever 94 to rock counterclockwise, whereupon dog 92 rocks into engagement with cam 89, so that a coupling is effected through which shaft 90 is also rotated clockwise, as long as rack 43 continues to move toward the left. The parts are so proportioned that shaft 90 is given a complete rotation during the advance stroke of rack 43 and on its return stroke cam 89 returns to its initial position, leaving the shaft 90 advanced. Near the end of the stroke block 93 raises lever 94 back to the position of Fig. 7 and therewith dog 92 is rocked out of engagement with cam 89.

During the subsequent punching operations, shaft 90 is stepped counterclockwise while cam 89 remains stationary and for this reason lever 94 is configured to hold dog 92 out of engagement for a short angular distance, until its engaging end has passed over the cam notch.

Referring to Figs. 24 and 25, the opposite end of shaft 90 has secured thereto a gear 95 meshing with teeth in the lower edge of carriage rack 81, so that when rack 43 is moved toward the left, carriage rack 81 moves stop 82 and pusher 83 in the opposite direction to the position of Fig. 1, where they receive the card advanced by pickers 39. Rack 43 returns to its starting position without accompanying return of rack 81, which latter rack is subsequently advanced step by step during punching operations to the position from which the card is ultimately ejected.

Referring now to Fig. 2, the cam 53 cooperates with a roller in a spring urged follower arm 96 pivoted at 97. At its upper end, arm 96 is connected to a link 98 whose opposite end (Fig. 9)

carries a plate 99 provided with a slot 100 in which a pin 101 fast on a gear sector 102 extends. During the first half revolution of cam 53, it rocks arm 96 clockwise and link 98 is drawn to the right and through spring 103 anchored to pin 101, sector 102 is rocked clockwise and in turn rotates pinion 103 counterclockwise. The pinion is secured to rod 104 upon which the ejector jaws designated generally as 86 are secured, so that rotation of pinion 103 will rock the jaws and the card therebetween to deposit the card in the hopper 87. The manner in which the jaws grip the card and reopen to release it is well known and explained in detail in Patent 2,333,461, so that the same will not be repeated herein.

In Fig. 9 sector 102 is provided with an offset 105 with which an armature lever 106 pivoted at 107 cooperates, so that when magnet 108 is deenergized, the lever 106 engages offset 105 to lock the segment 102 against operation through spring 103 and the latter will yield. Magnet 108 is energized when it is desired to effect ejection of a card and remains deenergized when it is desired to prevent ejection of a card to allow it to remain in the carriage for return therewith, so that punching may be effected in a further deck.

In Fig. 9 pin 109 in link 98 will engage a lever 110 to rock the same and open a pair of contacts 111 whose function will be explained in connection with the wiring diagram.

*The punching mechanism*

The punches 85 (Figs. 11 and 36) are arranged in a row containing twenty-one individual punches spaced to correspond to the spacing of the punching positions in the three decks A, B and C of the card of Fig. 38. Each punch is slotted near its upper end to receive the rounded end of a lever 112 which is pivoted at 113 and spring biased in a clockwise direction. An interposer 114 is pivoted at 115 to lever 112 and normally occupies the position shown in Fig. 11. The interposer is provided with a slot 116 into which a pin 117 of a lever 118 pivoted at 118a extends (Fig. 36). A spring 119 normally urges and holds lever 118 in the position of Fig. 11 against a metallic plate 119a backed by sound deadening material, and through pin 117 the interposer is held in the position shown.

Punch selecting magnet 120, of which there is one for each punch, when energized, attracts its armature 121 having its upper end T-shaped, and through link 122 will rock lever 118 to the position of Fig. 36 to swing interposer 114 through an angle which will bring slot 116 into a vertical position. This movement will bring a shoulder 114a into vertical alignment with the lower edge of punch bar 123, so that the bar in its descent will engage the shoulder 114a to drive down the interposer 114, connected lever 112 and related punch 85 to the position of Fig. 36.

Punch bar 123 (Fig. 12) is provided with pins 125 in its ends which are oscillatable in slides 126 suitably guided for vertical reciprocation in the framework. The lower ends of the slides are tied together by restoring bar 127 and their upper ends are pivoted to links 128 which connect with arms 129, one of which is secured to a shaft 130 and the other to a pivot pin 131 on the frame. Link 132 connects the links together for parallel movement thereof and the operation is such that as shaft 130 is rocked clockwise, as viewed in Fig. 12, the toggles formed by arms 129 and links 128 will first straighten and force slides 126 down and after crossing "dead center" the toggles will break again to pull the slides up. Upon the return rocking of shaft 130, the action will be reversed to effect another straightening of the toggles as the arms and links return to the position of Fig. 12.

Bar 123 has an ear 133 extending therefrom (Figs. 12, 13, 13a and 36) which lies in the plane of an upper stop screw 134 and a lower stop screw 135. When the bar moves up, ear 133 engages stop 134 to rock bar 123 counterclockwise against plunger spring 136, so that in its upper position it is located as in Figs. 11 and 13a with its upper edge to the left of the horizontal arm of lever 118. As the bar moves down, ear 133 strikes stop 135 and swings clockwise into the position of Fig. 36, where its upper edge lies beneath the horizontal arm of lever 118. Accordingly, upon rising from the position of Fig. 36 bar 123 will first engage and rock lever 118 and therethrough rock interposer 114 back to its initial position, this positive action continuing until coaction between ear 133 and stop 134 has rocked the bar out from under lever 118, which occurs near the very end of the upstroke of the bar to insure practically full restoration of lever 118 and interposer 114 and incidental restoration of armature 121 through link 122. The accompanying upward movement of bar 127 will cause levers 112 to be positively restored with their punches 85 and interposers 114. Thus, bar 123 effects angular restoration and bar 127 effects vertical restoration of interposer 114 with the two movements taking place concurrently.

Figures 14, 15, 16, 17:
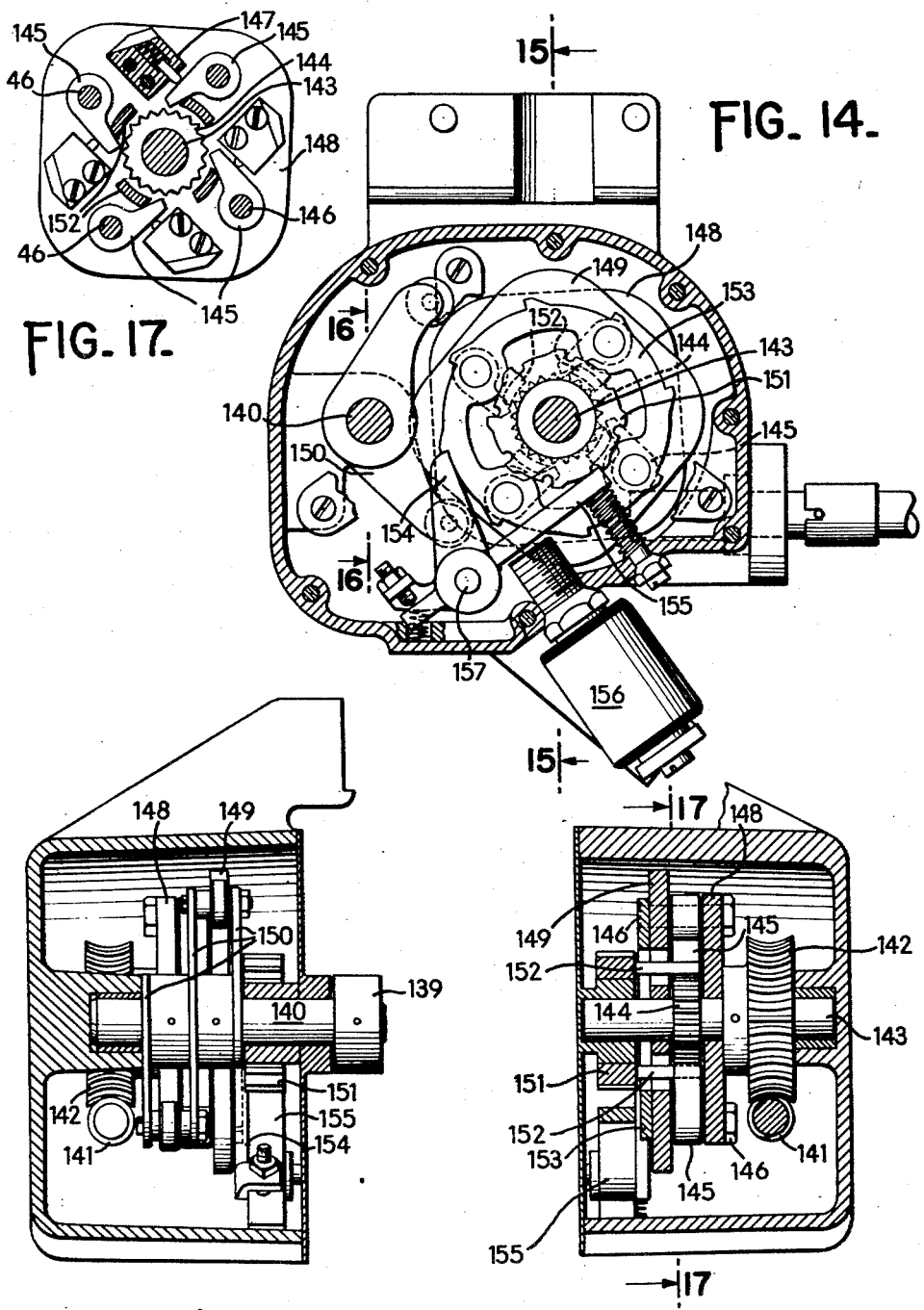
Fig. 14 is a detail section of the punch operating clutch mechanism.
Fig. 15 is a section taken on line 15—15 of Fig. 14.
Fig. 16 is a section taken on line 16—16 of Fig. 14.
Fig. 17 is a section taken on line 17—17 of Fig. 15.

In Figs. 12 and 13, shaft 130 has secured thereto an arm 137 connected to a vertical rod 138 which in Fig. 2 has its lower end connected to an arm 139 on a rod 140 and through this rod a power drive is obtained from the fo'lowing devices. As indicated in Fig. 2, the shaft of motor 49 through an extension thereon drives a worm 141 meshing with wheel 142 secured on a shaft 143 (Fig. 15) which has integral therewith a notched wheel 144. Lying in the plane of this wheel (Fig. 17) are four dogs 145 pivoted on pins 146 and urged toward the wheel by springs 147. The pins 146 and spring supporting blocks are secured to a cam 148 which is loose on shaft 143 and is integral with a second cam 149. These two cams are complementary (see Fig. 14) and cooperate with rollers on follower arm 150 secured to shaft 140. As seen from Fig. 14, an eighth of a revolution of cams 148, 149 will rock shaft 140 clockwise and this movement through arm 139 (Fig. 2), rod 138 and shaft 130 (Figs. 12 and 13) will, as explained, effect one reciprocation of the punch bar 123 and associated restoring bar 127 to constitute a first punching operation.

A second eighth of a revolution of cams 148, 149 will rock shaft 140 back again and this return movement will effect a second punching operation, so that for each eighth revolution of the cams there is a punching operation. The manner in which the cams are given such eighth revolution is as follows. Shaft 143 (Figs. 14 and 15) has freely mounted at one end thereof a toothed wheel 151 from which four fingers 152 extend through cam 149 and under dogs 145 to normally hold the dogs out of engagement with wheel 144 against the action of springs 147. The cam 149 has attached to it a detenting ring 153, one of whose teeth is engaged by a detent 154 to hold the cams against retrograde or counterclockwise movement. Wheel 151 is held against clockwise movement by engagement of a tooth thereof with armature 155 of a magnet 156. This armature is freely pivoted at 157 and spring urged against the wheel.

Upon energization of the magnet 156, wheel 151 is released and springs 147 acting against dogs 145, and these in turn bearing against fingers 152 will cause the fingers and now released wheel 151 to turn clockwise to permit the dogs 145 to engage in the teeth of constantly turning wheel 144, whereupon the cams will be driven. If magnet 156 is deenergized before the next tooth of wheel 151 reaches the armature, the latter will be in position to intercept such following tooth and hold fingers 152 against clockwise rotation beyond an eighth revolution, so that driving wheel 144 will drive the dogs up onto the fingers and disengage therefrom after an eighth of a turn, when dog 154 will drop behind the next tooth in ring 153 to hold the parts in declutched position. This briefly constitutes what may be termed an eighth revolution clutch.

Referring to Fig. 12, the left hand slide 126 has attached thereto a bracket 158 which through an insulating member 159 operates a pair of contacts 160 to permit closure thereof on the downstroke of the slide and to reopen them on the upward return stroke.

*Escapement mechanism*

Referring to Figs. 12 and 22, the bracket 158 which is reciprocated once for each punching operation has an eye bolt 161 secured thereto from which a link 162 depends and connects with a bell crank shaped member 163 pivoted on a stud 164 and provided with a pin 165 which extends into an elongated slot in stepping dog 166. Also pivoted on stud 164 is a member 167 adjustably engaged with member 163 through spring and screw connection 168, so that it oscillates with the latter member when bracket 158 is reciprocated. Member 167 has a pin 169 extending into a notch in holding dog 170 which is pivoted at 171. Thus, as link 162 descends member 167 rocks clockwise to tilt dog 170 into engagement with a tooth of carriage rack 81 and concurrently dog 166 is tilted out of engagement with the rack. This dog has a loose fit on stud 164, so that when tilted out of the rack teeth its spring 172 will draw it a short distance to the left where its tooth engaging end will be in position to engage the next rack tooth when the parts restore through the upward return of link 162. The rack 81 is, as usual, biased toward the right as viewed in Fig. 22 through a gear 173 connected to the usual spring drum in which the spring 173a is wound up when the carriage moves to the left and unwinds as it steps or escapes to the right.

Abutting the left edge of stepping dog 166 is a lever 174 arranged so that, when the dog is released for movement to the left, lever 174 will be rocked to open contacts 175 and they will reclose when the dog intercepts another tooth and is shifted back to the right by the rack 81.

*Automatic skip control mechanism*

Referring to Fig. 23, a bracket 176 secured to the framework of the machine has pivoted thereto at 177 a finger 178 whose right hand end extends beneath the stepping dog 166 (Fig. 22) and its operation is such that, if the finger is rocked counterclockwise as viewed in Fig. 23, it will raise dog 166 out of engagement with rack 81 to free the rack for movement to the right (Fig. 22) under the influence of the gear 173 driven by the spring drum. Return of finger 178 will allow the dog 166 to reengage the rack teeth under influence of its spring 172 to interrupt the advance of the rack.

By means of the mechanism about to be described, the finger 178 may be automatically actuated to initiate a so-called skipping action when the carriage rack is in any selected position and the skipping may be terminated at any subsequent carriage position. In Fig. 23 a rod 179 suitably mounted in fixed brackets for oscillation through a slight angle has a lever 180 secured thereto which carries a pin 181 lying beneath a cam surface 182 on the lower edge of finger 178. A spring urged detenting roller 183 engages the top edge of lever 180 to hold it in the position shown or in a position a few degrees clockwise when pin 181 is in line with the higher portion of cam surface 182 through which the finger is rocked to its counterclockwise or skipping position.

Secured to rod 179 is an upstanding plate 184 (see Figs. 26, 27, 40 and 41) which extends parallel to carriage rack 81 and is coextensive with the extent of movement of the rack. The rack 81 has a bracket 185 secured thereto (see also Fig. 29) to which a sleeve 185a is attached, in which sleeve a short rod 186 is pivoted and also slidable with a member 187 at one end thereof. As viewed in Fig. 29, member 187 is configured to form jaws 188 straddling the upper edge of plate 184, so that as the carriage rack moves in either direction jaws 188 will slide along the plate 184 and, if rod 186 is rocked during such movement, the jaws 188 will rock plate 184 and rod 179 likewise.

The member 187 has a pair of fingers 189 (Figs. 26 and 27) extending in a direction parallel to rod 186 which lie beneath interposers 190S and 190P. Thus, it will be noted that, if interposer 190S is depressed, member 187 will be rocked counterclockwise as viewed in Figs. 29 and 37b to rock rod 179 clockwise and raise finger 178 (Fig. 23) to its skipping position. If thereafter interposer 190P is depressed, the member 187 is rocked (Fig. 37a) in the opposite direction to enable finger 178 to tilt back to its normal or punching position.

Figure 29:
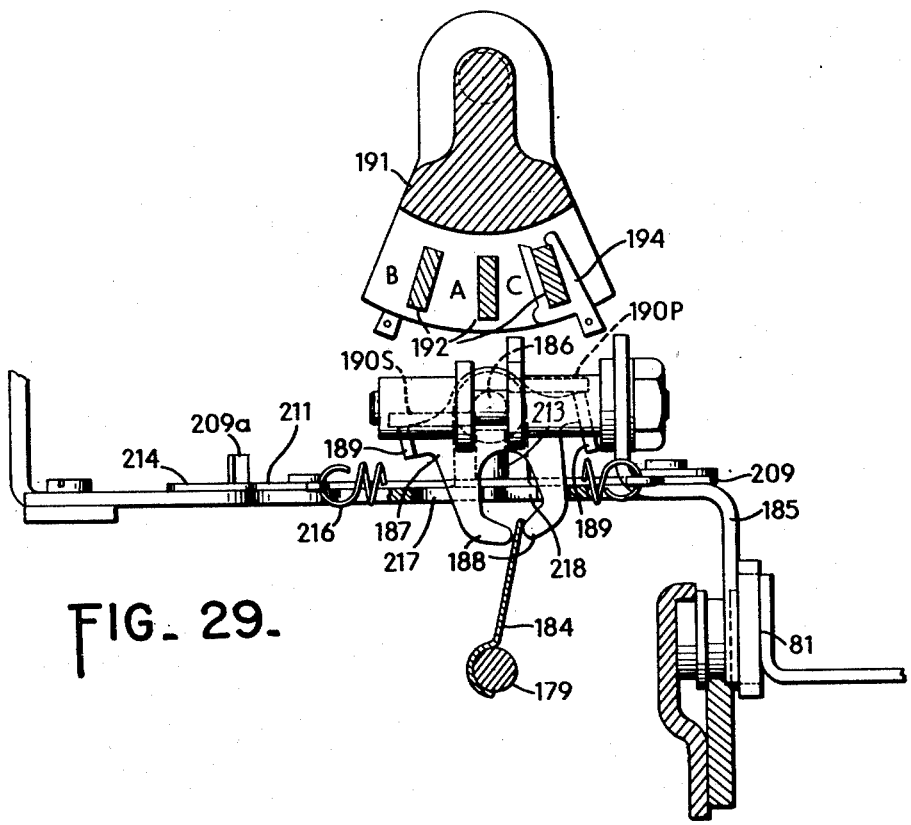
Fig. 29 is a section taken on line 29—29 of Fig. 26.
Figure 29A:
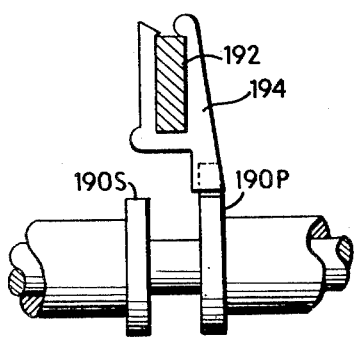
Figs. 29a and 29b are detail views of different clip tab settings.
Figure 29B:
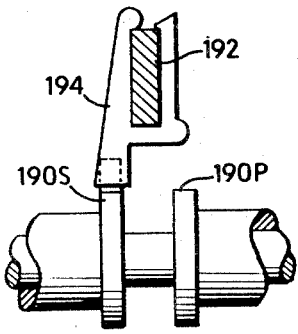

The means for depressing the interposers 190S and 190P comprises a holder 191 to which are secured three angularly spaced bars 192 designated A, B and C. The holder is provided with sixty slots 193 (Fig. 26) cut transversely therein, there being one for each column of the card. Into these slots a clip 194 may be inserted as shown in Fig. 29 which is resilient to slip over the bar 192 and snap behind the inner edge thereof to hold it in place. The outer end of the clip has a head lying to one side of bar 192 so that, when placed in the position of Fig. 29a on bar 192, the head will be in line with interposer 190P and, when reversed and inserted as in Fig. 29b, the head will be in line with interposer 190S.

With the foregoing arrangement, as the carriage rack 81 advances, it carries with it bracket 185 (Fig. 26) and interposers 190S and 190P, which will engage stationary clips 194 on the central or B bar 192 and be tilted thereby to lift the stepping dog 166 out of the rack or drop it back in again, with the positions of the clips along the bar, of course, determining the points in the carriage travel that such actions are to occur.

As stated hereinabove, when more than one deck is to be punched, the card is retained in the carriage to make two or three passes during the first of which data may be key punched in deck A, in the second data may be key punched in deck B, and in the third data may be key punched in deck C. For each deck, there may be different skipping conditions so that the three bars 192 are provided and identified as A, B and C to correspond to the similarly designated decks. The central bar has its clips distributed for deck A conditions and the holder occupies the position of Fig. 29 during the first pass. During the second pass holder 191 is rocked counterclockwise as viewed in Fig. 29 to bring the B bar 192 into the position of the A bar, and during the third pass the holder is rocked in the opposite direction to bring the C bar 192 into the position of the A bar.

Figure 28:
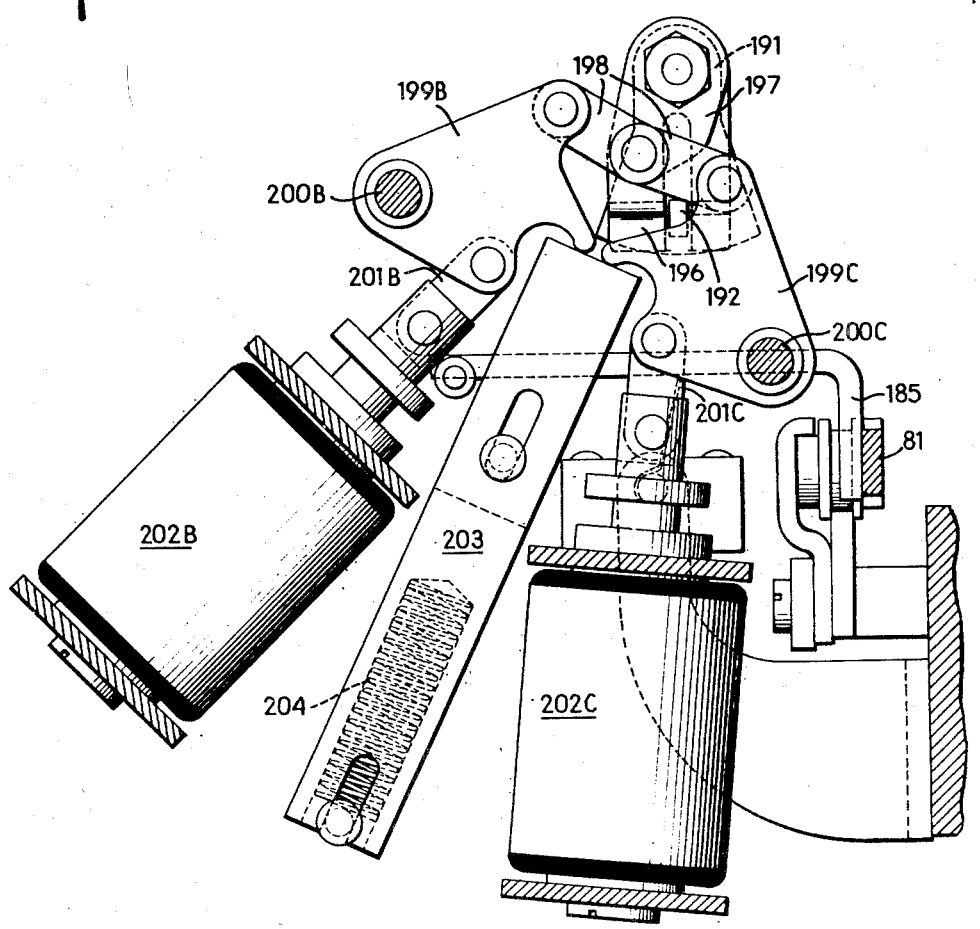
Fig. 28 is a section taken on lines 28—28 of Fig. 26.

The mechanism for effecting this shifting of holder 191 is shown in Figs. 26, 27 and 28, where the central bar 192 is shown as extending from holder 191 into a bifurcation of a lever 196 integral with arm 197. This arm is connected by a pair of links 198 to levers 199B and 199C pivoted on fixed studs 200B and 200C and having connections 201B and 201C with plungers of solenoids 202B and 202C. A slide 203 actuated by a spring 204 bears normally against levers 199B and 199C to draw links 198 oppositely and hold arm 197 and consequently holder 191 in its central position with its A bar 192 in active position.

When solenoid 202B is energized, it will rock lever 199B clockwise as viewed in Fig. 28 and swing arms 197, 196 counterclockwise to bring the B skip bar 192 (Fig. 29) into active position with respect to interposers 190S and 190P. Likewise, when solenoid 202C is energized, lever 199C rocks counterclockwise to swing arms 197, 196 clockwise to bring the C skip bar 192 into active position. Upon deenergization of the solenoids, spring 204 and slide 203 restore the parts to their normal position of Fig. 28, where the A bar 192 occupies the active position.

The holder 191 is removable from the machine to facilitate the insertion, removal or rearrangement of clips 194 thereon. It is held in place by engagement of a hole in its left end (Figs. 26 and 27) with stationary stud 205 at the engagement of a hole in its right end (Figs. 24 and 25) with a spring pressed shouldered plunger 206 which is retractible in stationary block 207 to permit removal of the holder.

In Fig. 23, a skip magnet 221 is provided, which when energized will rock its armature 222 against a depending extension of lever 180 to rock rod 179 and tilt finger 178 to its skipping position.

Referring to Figs. 26 and 27, the rod 186 has a pair of collars 212 integral therewith between which a pin 213 extends (see also Figs. 40 and 41). This pin is carried by a bell crank 209 pivoted at 208 to bracket 185. When the carriage is advancing toward the left during punching operation, bell crank 209 occupies the position of Fig. 41, where a projection 209a is latched behind shoulder 211a of a latch 211 pivoted at 210 to bracket 185.

The arm 189 of member 187, which coacts with interposer 190P, has a high portion and a low portion, while the arm 189 which coacts with interposer 190S has only a high portion. With the parts in the position of Fig. 40, both high portions of arms 189 lie beneath the respective interposers and, as the carriage advances, the member 187 will be rocked in accordance with the arrangement of clips 194 set in the path of the interposers.

When the carriage advances to its so-called "last column" position, that is, when the last column if punched has escaped one step past the row of punches, a finger 214 (Fig. 41) of latch 211 engages a fixed stop screw 215 to cause rocking of the latch and release of bell crank 209, whereupon spring 216 will rock the bell crank to the position of Fig. 27. Through pin 213 and collars 212 the rod 186 is slid to the right in sleeve 185a carrying member 187 therewith to a position where interposer 190P has its free end adjacent to the low portion of the related arm 189 as shown in Fig. 26.

Figure 37:
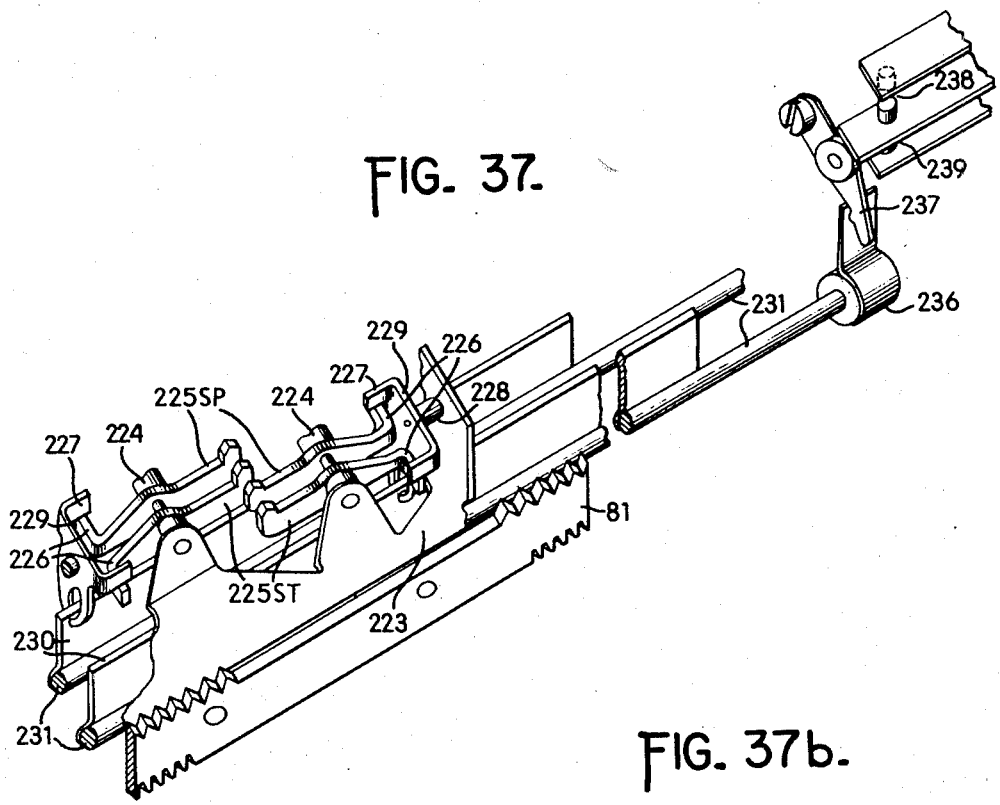
Fig. 37 is an isometric of part of the column skipping mechanism.
Figures 37A, 37B:
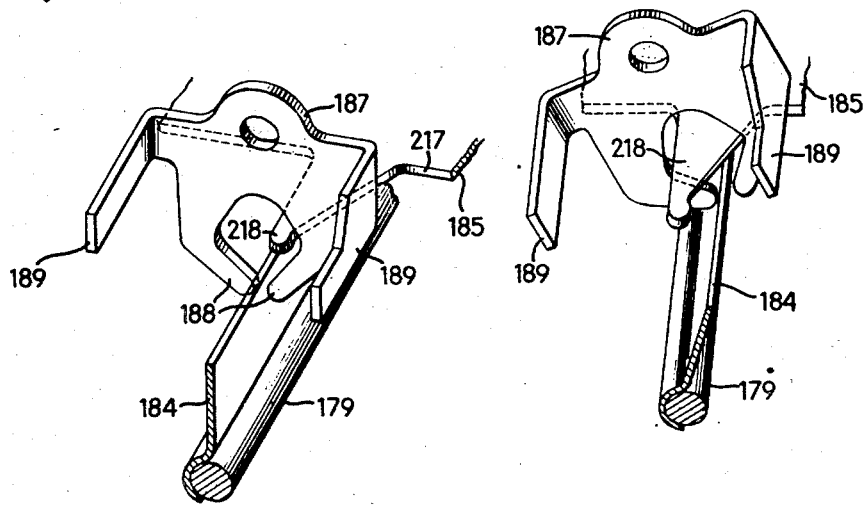
Figs. 37a and 37b are isometrics of details of parts shown in Figs. 27 and 29 in different positions.

The bracket 185 is configured as shown in Figs. 27 and 37a to provide an opening 217 through which jaws 188 extend. This opening is shaped to provide a cam surface 218 which extends between the jaws 188. With the parts in the position of Figs. 41 and 37a this cam surface offers no hinderance to the rocking of the jaws. However, when the jaws are slid with member 187 to the position of Figs. 27 and 37b, the cam surface 218 will engage and cam the jaws counterclockwise as viewed in Figs. 29 and 37b to rock plate 184 and rod 179 to their skipping position, that is, the stepping dog 166 will be raised and held out of rack 81. As the carriage is returned, this relationship is maintained. It will be noted that as the carriage returns, the skip clips as they are passed will have no effect because the parts are in skipping position and the stop clips will also have no effect because the interposer 190P is off the high portion of its arm 189 and, when resting on the low portion, it is beneath the clips as seen in Fig. 26.

As the carriage approaches its start or "first column" position, the end 209b of bell crank 209 (Figs. 25 and 41) will engage a stationary plate 219 and be rocked thereby back to its latched position as in Fig. 41, where it will remain until it is again unlatched in the "last column" position. This relatching has through pin 213 on bell crank 209 shifted lever 187 back to its position of Fig. 41. At this point, the carriage is in its first column position and, if there is a stop clip 194 in the column 1 position, it will lie directly above the contacting end of interposer 190P. Therefore, as arms 189 are shifted leftward, the end of interposer 190P will ride up an incline from the low to the high portion of its arm 189. Since the interposer is blocked against rocking by a clip, the arm 189 will be forced down and cause rocking of member 187 and its jaws 188 to their stopping position with the result that dog 166 is lowered into engagement with rack 81 to intercept it in its first column position when the power drive returning the rack is disconnected.

If there is no stop clip 194 set in the column 1 position, the shifting of member 187 and arms 189 to the left will simply rock interposer 190P slightly and the jaws 188 will remain detented in their skipping position with dog 166 still held out of rack 81. Accordingly, when the rack is released from its returning drive, the carriage will immediately advance with an interrupted movement until a stop clip is encountered, which will free dog 166 to stop the carriage.

*Automatic duplicating control mechanism*

Figure 6:
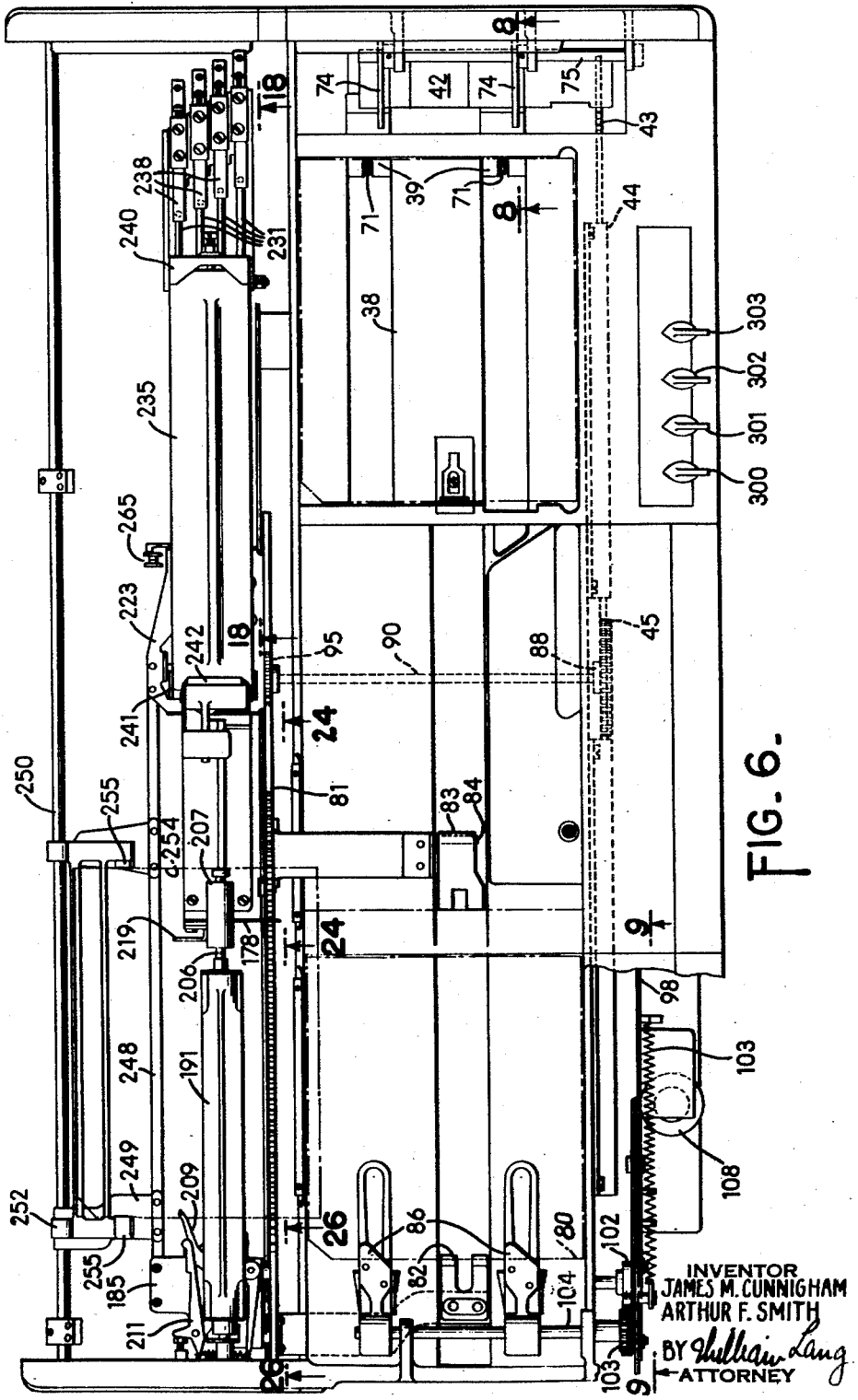
Fig. 6 is a plan section looking in the direction of line 6—6 of Fig. 2.

Referring to Figs. 6, 18 and 19, the carriage rack 81 has secured thereto at its right hand end a bracket 223 which will accordingly reciprocate with the rack. Pivoted on this bracket on rods 224 are four pairs of interposers designated 225ST and 225SP. The four pairs are alike, so that a detailed explanation of one pair will suffice for all. The interposers of a pair are both offset outwardly at 226 (see also Fig. 37) to lie beneath fingers 227 of a member 229 pivoted at 228 to the bracket 223. Member 229 is jaw-shaped at its lower end to straddle a plate 230 secured to rod 231 which is coextensive with the extent of travel of the carriage, so that as the carriage rack is advanced and returned, the jaw members 229 slide along their respective plates 230 (see also Fig. 20).

It will be observed in Figs. 18, 19 and 37 that alternate pairs of interposers extend in opposite directions, in order to provide a compact spacing therebetween and so that upwardly extending ends thereof all lie in a straight line and in the paths of clips 233 carried by bars 234 secured in a holder 235 (see Fig. 20). The holder 235 is cross slotted in the same manner as skip bar holder 191 and clips 233 have the same configuration as clips 194 and each clip is insertible in either of two manners, so that its depending tab will engage either interposers 225ST or 225SP.

As the interposers travel with the rack, a clip inserted in a slotted columnar position will cause the interposer to tilt as it passes the clip and will in turn rock jaw member 229 to rock the related plate 230 and rod 231. Each rod 231 has an arm 236 at its right hand end (Figs. 21 and 37) which, when rocked clockwise in Fig. 21, will tilt a lever 237 to shift contacts 238, 239 to closed and open positions, respectively, which will control circuits to be explained in connection with the wiring diagram.

The four bars 234 are identified as A, B, C and D (Fig. 20) and the first three are associated with like designated decks of the card, that is, clips 233 are set on the A bar 234 in accordance with duplicating conditions for deck A, etc. Clips set on D bar 234 are in accordance with automatic spacing conditions as will be more specifically explained hereinafter.

Holder 235 is removable for ready insertion of clips 233 and its right end (Fig. 18) is inserted in a slot of member 240 while its left end (Fig. 24) rests on a stationary bracket 241 to which a locking lever 242 clamps it. To remove the holder the lever 242 is tilted clockwise against spring 243 to free the left end and the holder can thereupon be slid out of the member 240.

In Fig. 21 the left hand rod 231 related to the D bar 234 has a downward extending tab on its finger 236 whereby magnet 244 when energized may through its armature 245 rock the finger and rod clockwise to shift related contacts 238, 239. When holder 235 is in place, it engages a pin 246 (Figs. 18 and 21) to open a pair of contacts 247.

*Pattern card feeding mechanism*

Figure 4:
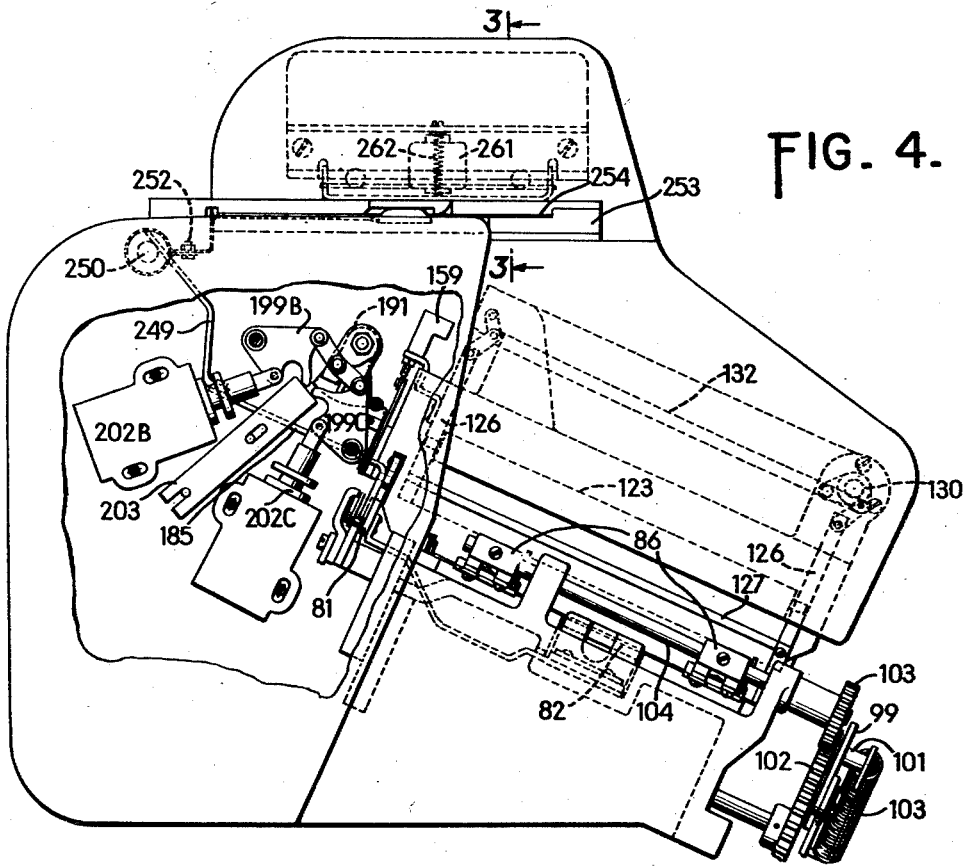
Fig. 4 is a view looking in the direction of line 4—4 of Fig. 2 and constitutes a view looking at the left end of the apparatus.

Referring to Fig. 6, the brackets 185 and 223 which reciprocate with the card carriage rack 81 are tied together by a bar 248 to which there is secured a plate 249 whose upper end rests on a rod 250 (see Fig. 4) and is bifurcated to straddle the hub 251 of a frame 252, so that this frame is shifted along rod 250 in accompaniment of rack 81. The frame is bent as shown in Fig. 4, so that the arms thereof extend over and rest upon a table or platform 253 upon which a pattern card 254 is placed and located between the pushers 255 as indicated in Fig. 6, so that this card travels back and forth with the carriage and is traversed by a sensing element 256 (Fig. 3) in the form of a toothed or star wheel pivoted on a lever 257.

The pattern card has three decks corresponding to the card of Fig. 38 with like hole positions and there are twenty-one wheels 256 provided to traverse the twenty-one rows of positions. When a hole is encountered, a tooth of the wheel drops therein and allows tilting of lever 257 so that through plunger 258 a pair of contacts 259 close. This card sensing device is not per se part of the present invention and is shown and described in copending application of J. M. Cunningham Serial No. 770,349, filed August 25, 1947, now Patent 2,517,984, granted August 8, 1950, wherein it is claimed.

A bail 260 (Fig. 3) extends beneath all the levers 257 and, when magnet 261 is in deenergized condition, a spring 262 acts to rock bail 260 clockwise to tilt the levers 257 and raise wheels 256 above the card. Accordingly, the wheels are in sensing relationship with the card only when magnet 261 is energized. Magnet 261, when energized, will close a pair of contacts 263 as diagrammatically indicated in Fig. 3.

In Fig. 8 the usual hopper contacts 264 are provided to close when cards are placed in hopper 38 and to open when all have been removed.

In Fig. 6 the usual "last colmun" contacts 265 are provided to close as diagrammatically shown when the card carriage escapes from or passes through its last column punching position and to open in all other positions.

In Figs. 11 and 25 the skip finger 178 has a lever 266 underlying its free end, and this lever may be rocked through rod 267 and arm 268 by a link 269 which is actuated by release magnet 120R so that, when this magnet is energized, the end of finger 178 will be raised to lift the stepping dog 166 out of the rack 81 and allow it to advance uninterruptedly.

*Operation*

The operation of the machine in its entirety will now be explained to illustrate the manner in which the several mechanisms described hereinabove are coordinated.

Figure 5:
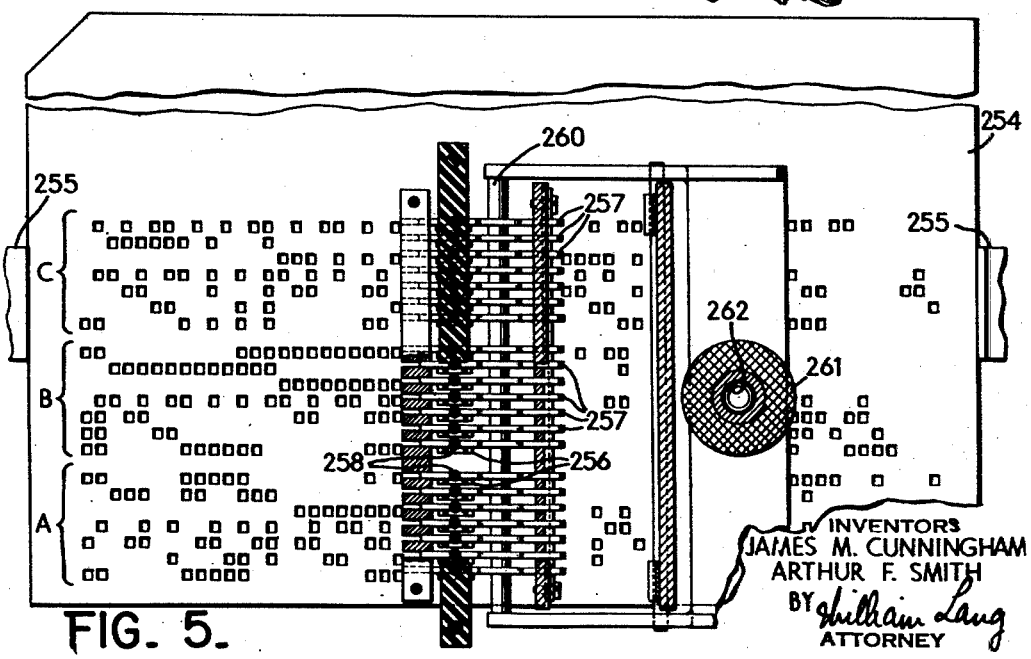
Fig. 5 is a plan section on line 5—5 of Fig. 3, showing the pattern card sensing devices.

The card of Fig. 38 is to be perforated with variable data punched in the fields labeled "Key Punch" under control of manually operated keys 10 (Fig. 30) and common data in the fields labeled "Duplicate" under control of the pattern card 254 (Fig. 5), which latter will have perforations in its corresponding fields. The fields labeled "Skip" are to be left blank and automatically passed. Since, for the assumed problem, key punching is to be effected in three decks A, B and C, the machine will be conditioned to execute three so-called "passes" of the card by the row of punches. During the first pass, the key punch data is entered into the left hand field of deck A and also into a second later presented "Key Punch" field. The card is then returned for a second pass during which data is keyed into deck B and during the third pass data is keyed into deck C. All duplicate data (for all three decks) is punched automatically during the first pass.

Mounted on the machine (Figs. 1 and 6) are four switches 300, 301, 302 and 303 shown also in Fig. 39b (bottom) and Fig. 39 as having three active positions and an off position (dotted). Switch 301 controls key punching during the first pass and is set at A to indicate that the A deck is to be key punched during the first pass. Switch 302 controls key punching during the second pass and is set at B to indicate that the B deck is to be key punched during the second pass. Switch 303 controls key punching during the third pass and is set at C to indicate that the C deck is to be key punched during the third pass. Briefly, switches 301, 302 and 303 are set in accordance with which deck is to be key punched during a particular pass.

The eject switch 300 controls the point at which or the pass following which the card is to be ejected. Thus, for the present problem where three decks are to be key punched, switch 300 is set at 3 to indicate that the card is to be ejected after the third pass is completed.

The skip stop holder 191 (Fig. 38) has clips 194 positioned thereon with the heads thereof (blackened for emphasis) facing upward for a skip condition or downward for a stop condition for each of the three decks. The setting of the clips follows the card field arrangement and is in accordance with the following rules. A clip 194 is set with its head on the skip side in the column in which skipping should start and a clip is set with its head on the stop side of the column after the one in which skipping should stop.

As has already been explained, the mechanism is designed to automatically skip from the first or number 1 column without use of a skip-set clip 194. A stop clip set in column 1 of deck A will disable this automatic skip at column 1 to enable key punching beginning with column 1 in this deck. Advance of the A deck then proceeds under key control to column 24 where duplicating takes over to column 33 and then key punching to column 48. In column 49 a skip clip is set to initiate skipping the remainder of deck A.

In deck B the skip stop is set in column 1 so that key punching can be effected in the first columns and a skip clip is set in column 7 to skip out the rest of deck B, since the "duplicate" field will already have been punched during the first pass.

In deck C no skip stop is set in column 1 so that the card immediately and automatically skips to column 24 where a skip stop clip is inserted and then keying takes place to column 37, where a skip clip causes skipping over the already punched "duplicate" field and to the end of the deck.

The duplicating holder 235 has clips 233 set coextensively with the "duplicate" fields of the three decks, that is, a start clip is set in the column corresponding to the first duplicated position and a stop clip is set in the column corresponding to the one after the last duplicated position. Thus, for the problem under consideration start clips are set in columnar positions 24, 17 and 37, for the A, B and C decks, respectively, and stop clips are set for them in columnar positions 33, 40 and 49 in the same order.

The clips on the D bar 234 of holder 235 which control automatic spacing are set as follows. When setting the clips on the auto space bar 234, it is necessary to determine the first column of the card which must be spaced over, independent of a skip or key action, bearing in mind that escapement or spacing of the carriage rack occurs only through key action or through automatic spacing mechanism, and that duplicating alone will not cause escapement. Since all duplicating is accomplished in the first pass, only this pass need be considered when setting the auto space clips, as subsequent passes will involve only key punching or skipping. Thus, considering deck A (Fig. 38) the first key punch field in which a name is to be punched has eighteen columns allocated thereto to accommodate names of variable length. Where a name requires less than eighteen columns, the space key is operated to space over the remaining column of this field. Columns 19 to 23 are to be automatically spaced. Then columns 24 to 32 are to be duplicated and require automatic spacing in accompaniment therewith. Accordingly, the start clip is set in column 19 and the stop clip is set in column 33.

In Fig. 1 there are three switches 304 designated A, B and C related to like identified decks, and these when set to their "on" positions will cause duplication to be effected in such decks. These switches are shown in Fig. 39 (upper right).

A fourth switch 305 (Figs 1 and 39b) has "Manual" and "Automatic" positions. When set to "manual," ejection is suppressed and permits card insertion by hand from the left side of the machine, in which case the carriage rack must also be pushed into punching position from the left by hand. When set to "automatic" as for the present example, ejection will occur automatically upon completion of three passes.

*Circuit Diagram*

Current is supplied to main lines 306 and 307 (Fig. 39) from a suitable source and switch 308 is closed to supply current to motor 49. With the pattern card 254 placed in position, blank cards are inserted in hopper 38 which results in closure of hopper contacts 264 (Figs. 8 and 39b).

Operations are started by depressing the "Release" key 10 (Fig. 30) which through the keyboard devices will rock both the "release" and key bail rods 27 (Fig. 35) to cause closure of the contacts 36, 37 related thereto. These contacts are identified in Fig. 39a and upon closure complete a circuit traceable as follows. From line 306 (Fig. 39) latch contacts 60, wire 310, g contacts of a relay R12 (in normal position), escapement contacts 175, wire 311 (Fig. 39a), b contacts of relay R14, key bail contacts 36, 37 (now closed), a contact of relay R14, wire 312 and punch magnet 156 to line 307. A parallel circuit branches from the key bail contacts through the a contacts of relay R18, release contacts 36, 37 (now closed), wire 313 (Fig. 39), relay R15 to line 307.

Relay R15 will close its b contacts to provide a holding circuit traceable from line 306, contacts 111, wire 314, b contacts of relay R15 and the relay R15 to line 307. This relay will accordingly be held energized until contacts 111 (Figs. 2 and 9) open midway in a card feeding cycle of operation.

Relay R15 shifts its a contacts to complete a further circuit from line 306, contacts 111, wire 314, b contacts of relay R15, a contacts of relay R15 (shifted), relay R6 to line 307, so that relay R6 is held concurrently with relay R15. The relay R6 closes its a contacts to set up an additional holding circuit traceable from line 306, contacts 111, a contacts of relay R6, and relay R6 to line 307.

In Fig. 39b, a circuit is now traceable from line 306, d contacts of relay R15 (now closed), wire 315, c contacts of relay R6 (now closed), hopper contacts 264 (closed), and relay R16 to line 307. This relay closes its a contacts to set up a holding circuit from line 307, relay R16, its a contacts, wire 316 (Fig. 39) and contacts 111 to line 306, so that relay R16 is also held until the middle of a card feed cycle of operation.

Upon closure of the c contacts of relay R15, a circuit is completed (Fig. 39) from line 306, latch contacts 60, wire 309, wire 317, c contacts of relay R15 (now closed), and "release" magnet 120R to line 307. Energization of this magnet (Figs. 11, 25, 22 and 23) will tilt the release finger 178 to lift dog 166 out of rack 81 so the latter will be advanced from whatever position it may be in to its "last column" position, there being, of course, no card carried thereby at this time.

As stated before, the punch magnet 156 was also energized along with relay R15 so that an operation of the punch mechanism also takes place to reciprocate link 162 (Fig. 22) and cause dog 170 to engage the rack while dog 166 is lifted out. The purpose of this is to take the load of lifting dog 166 against the frictional pressure of the rack tooth from the light magnet 120R, so that all it needs to do is lift finger 178. On the return stroke of link 162, dog 170 is disengaged from the rack but dog 166 remains out and the rack will then advance.

The rack advances to a position where, if a card were in the carriage, it would be one column beyond the last or sixtieth column, and in advancing from this last column position the so-called last column contacts 265 (Figs. 6 and 39) close to complete a circuit through relay R18 which accordingly remains energized until contacts 265 reopen.

Relay R18 (Fig. 39b) shifts its f contact to complete a circuit from line 306, f contacts of relay R18 (upper), switch 305, wire 318, b contacts of relay R16 (shifted), wire 319, and relay R1 to line 307. A parallel circuit branches from wire 319, through the b contacts of relay R6 (now shifted) to rack clutch magnet 56 to line 307. The clutch magnet 56 (Fig. 2) will initiate a cycle of operations wherein the bottom card in hopper 38 is fed to its "first column" punching position and the card carriage is shifted to the right to receive the card which thereafter will advance under control of the keys and skip bar clips. The picker 39 will return to its right hand position in readiness to feed a second card.

The feeding of the first card is preceded slightly by operation of the eject mechanism which will be an idle operation at this time, since there is no card in the carriage. This operation is brought about as follows. In Fig. 39b, relay R1 has closed its a contacts to provide a holding circuit from line 307, relay R1, its a contacts, wire 316 (Fig. 39), wire 314 and contacts 111 to line 306. The relay R1 also closes its b contacts (Fig. 39) completing a circuit from line 306, contacts 111, a contacts of relay R6 (shifted), b contacts of relay R1 (shifted), b contacts of relay R18 (shifted), and eject magnet 108 to line 307. Energization of magnet 108 (Fig. 2) releases the eject mechanism for effective operation by link 98 which in the middle of its movement to the right will open contacts 111 to drop out the several relays whose holding circuits pass through contacts 111, specifically relays R1, R15, R6 and R16.

Relay R18 has also closed its c contacts to energize relay R17, through a circuit from line 306, wire 320 (Fig. 39), c contacts of relay R18 and relay R17 to line 307, and a holding circuit is set up from line 307, relay R17, its b contacts, and contacts 111 to line 306. This relay is ineffective at this point in the operation and will be de- energized upon the subsequent opening of contacts 111. As the carriage is shifted to the right, the last column contacts 265 reopen to deenergize relay R18.

Bearing in mind that the A skip bar is normally in active position with a skip stop clip in column 1, the carriage is held in column 1 punching position by the escapement dogs and the machine is in readiness to respond to key actuation in column 1 of deck A. As a preliminary, relay R12 (Fig. 39b) was energized through a circuit from line 307, relay R12, e contacts (upper) of relay R6, g contacts (upper) of relay R18 to line 306. This occurred upon the energization of relay R18 and relay R12 closes its a contacts to set up a holding circuit from line 307, relay R12, its a contacts, e contacts of relay R10 and wire 321 to line 306. Relay R12 closes its d contacts to complete a circuit, when relay R18 is deenergized, traceable from line 306, g contacts of relay R18 (normal), wire 322, d contacts of relay R12, switch 301 (set at A) and relay R24 to line 307. If switch 301 were set at B, relay R26 would be energized and, if switch 301 were set at C, relay R28 would be energized. In Fig. 39a, relay R24 closes its set of b contacts which will direct the selecting circuits from wires 324 to the magnets 120 related to deck A. Relay R26 when energized directs the circuits from these wires 324 to the B deck magnets 120, through its b contacts and relay R28 directs the circuits to the C deck magnets 120.

The operator now depresses the first punch selecting key 10 which, for the example of Fig. 38, is the J key and this in accordance with the combination code of Fig. 35 will close the 5, 1, 0, Y and bail contacts 36, 37 (Fig. 39a) resulting in completion of the following circuit. From line 306 (Fig. 39), latch contacts 60, wire 310, g contacts of relay R12 (shifted), contacts 239 related to the C deck, d contacts of relay R38, contacts 239 related to the B deck, d contacts of relay R35, contacts 239 related to the A deck, d contacts of relay R32, h contacts of relay R12 (shifted), escapement contacts 175, wire 311 (Fig. 39a), b contacts of relay R14, key bail contacts 36, 37, thence in parallel through the 5, 1, 0 and Y contacts 36, 37, b contacts of relay R22, to the 5, 1, 0 and Y wires of a group designated 324, b contacts of relay R24 (closed), b contacts of relay R32 (normal), the 5, 1, 0 and Y magnets 120 in parallel to line 307, b contacts of relay R14, key bail contacts 36, 37, thence in parallel through the 5, 1, 0 and Y contacts 36, 37, b contacts of relay R22, to the 5, 1, 0 and Y wires of a group designated 324, b contacts of relay R24 (closed), b contacts of relay R32 (normal), the 5, 1, 0 and Y magnets 120 in parallel to line 307.

A parallel circuit extends from the key bail contacts 36, 37 through the a contacts of relay R14 and wire 312 to the punch magnet 156, which will effect the punching operation and incidental spacing.

The card is now in column 2 position and the operator depresses the O key, resulting in punching of the combination Z, 0 for this letter through circuits similar to those already traced. Successively thereafter, the H, N, Space, J, O, N, E and S keys are operated to advance the card to its column 11 position. It will be noted that space key closes only the key bail contacts 36, 37 (see Fig. 35), and these close the circuit to the punch magnet 156 (Fig. 39a) whose operation, unaccompanied by punch selector operation, will simply operate the escapement dogs. For columns 11 to 18 the space key is repeatedly operated, since the name does not fill out the first field and as a result the carriage steps ahead to present column 19 to the row of punches.

From Fig. 38, it will be observed that column 17 of deck B is to receive duplicate punching and this is effected as follows. When column 17 is in position, the clip 233 set in start position causes closure of related contacts 238 and opening of related contacts 239, and these remain shifted until column 39 has passed the punches. In Fig. 39 the contacts 238 related to the B deck complete a circuit traceable from line 306, latch contacts 60, wire 310, h contacts of relay R12 (shifted), contacts 239 related to the C deck, d contacts of relay R38, contacts 238 related to the B deck (now closed), d contacts of relay R4, and relay R35 to line 307. Relay R35 shifts its d contacts to reclose the circuit opened by the B set of contacts 239, so that the circuit running to escapement contacts 175 is reestablished after the momentary opening by contacts 239.

In Fig. 39a, relay R35 shifts its b contacts to disconnect the magnets 120 of the B deck from the b contacts of relay R26 and instead connect them to the star wheel contacts 259 which sense the B deck of the pattern card.

In Fig. 39 the star wheel magnet 261 is energized through a circuit from line 307, magnet 261, e contacts of relay R18, g contacts of relay R12 (shifted), and latch contacts 60 to line 306. Accordingly, with the card in its column 17 position, the magnets 120 of deck B shift their related interposers into punching position, and magnet 156 couples the punch clutch to cause punching of the perforation combination representative of the numeral 1. As explained in the mechanical description, the punching operation causes closure of contacts 160 (Fig. 12), but this is of no effect at the present time. The incidental rocking of the escapement dogs 166, 170 (Fig. 22) steps the carriage ahead one column and opens contacts 175 momentarily, to break the punch selecting and operating circuits. The magnet 261 will be energized at the beginning of the first pass to lower the sensing wheels on the pattern card, so that as holes are encountered the contacts 259 will close in the punched combinations. However, circuit closure therethrough is only effective through the shifted b contacts of relay R35 for deck B, which shifting as explained occurs when column 17 is sensed.

The circuits for the duplicate punching are traceable from line 306 to wire 311 (Fig. 39a) as already traced, and thence through j contacts of relay R4, wire 325, contacts 259 (deck B), b contacts of relay R35 (shifted), and magnets 120 (deck B) to line 307. These circuits will only shift the punch interposers and will not effect punching by themselves. The actual punch magnet operation is responsive to the space key operation in column 17 for deck A which, when it takes place, will result in punching duplicate data in column 17 of deck B and spacing to column 18. In this column duplicating circuits are again set up and the punching action brought about by the space key.

In column 19 there is an auto space start clip 233 which will initiate a series of repeated energizations of punch magnet 156 to column 24 in which a stop 233 is inserted. The manner in which this is carried out is as follows. In Fig. 39 the auto space start clip 233 closes its contacts 238 to complete a circuit from line 306, latch contacts 60, g contacts of relay R12 (shifted), wire 331, wire 326, auto start contacts 238 closed by an auto space clip, k contacts of relay R4, relay R14 to line 307.

With relay R14 energized, its a contacts (Fig. 39a) are shifted and the punch magnet circuit is completed from line 306 to wire 311 as before, thence through the shifted a contacts of relay R14 to punch magnet 156 and line 307. This circuit is completed concurrently with the duplicating magnet selecting circuits, so that with the card in column 19 punching is effected in deck B and the card escapes to column 20 where the next punch selection is made through the holes in the pattern card to energize magnets 120 and the punch magnet 156 is energized again through the same circuit. It is to be noted that relay R14 now remains energized since the auto start contacts 238 (Fig. 39) will remain closed to column 33 wherein a stop clip will cause reopening of the contacts.

Accordingly, duplicating in deck B will continue uninterruptedly up to column 33 and then stop. In the meantime, when the card is in its column 24 position, duplicating in deck A is to commence and the start clip in this columnar position will shift related contacts 238, 239 (Fig. 39) of the A deck to complete the circuit from line 306, latch contacts 60, wire 310, g contacts of relay R12 (shifted), contacts 238 of deck C, d contacts of relay R38, contacts 238 of deck B (closed), d contacts of relay R35 (shifted), contacts 238 of deck A (closed), b contacts of relay R4 and A relay R32 to line 307. In Fig. 39a relay R32 shifts its b contacts so that the A deck magnets 120 are connected to the star wheel contacts 259 and duplicating in decks A and B will occur simultaneously for columns 24 to 32 inclusive.

The auto stop clip will, as explained, stop further escapement with the card in its column 33 position. The operator now key punches and spaces columns 33 to 48 inclusive, in the now familiar manner and concurrently therewith the remainder of the duplicate field of deck B is punched. When the last column has been punched, the duplicate stop clip set in column 40 for deck B will reclose its contacts 239 and reopen contacts 238, so that the related relay R35 (Fig. 39) becomes deenergized and disconnects the punch selecting magnets 120 from the star wheel contacts of deck B.

When the card arrives in its column 38 position, the duplicate start clip for deck C shifts related 238, 239 contacts (Fig. 39) to energize relay R38 through f contacts of relay R4. As a result, the selecting magnets 120 related to deck C (Fig. 39a) will be connected to star wheel contacts through b contacts of relay R38, and this connection will be maintained until the duplicating stop clip set in column 49 causes breaking of the connections.

With the card in its column 49 position, the skip clip 194 will cause mechanical release of the carriage and it will advance uninterruptedly to its last column position where it closes contacts 265 (Fig. 39) to energize relay R18.

The card has now had its A deck completely punched, and the duplicate fields of the B and C decks have also been punched. Relay R18 shifts its g contacts (Fig. 39b) to complete a circuit from line 306, g contacts of relay R18 (shifted), e contacts of relay R6 (normal) to feed latch magnet 73 and line 307. This prevents a new card from advancing from the hopper 38.

Previously, when relay R18 restored its g contacts to normal a circuit was completed from line 306, g contacts of relay R18 (normal), a contacts of relay R17 (normal), b contacts of relay R12 (shifted), relay R13 to line 307, and a holding circuit was set up from line 307, relay R13, its b contacts and wire 361 (Figs. 39a and 39) to the contacts 111 and line 306 to hold until the next eject operation.

With relay R13 now energized, a circuit is traceable (Fig. 39b) from line 306, g contacts of relay R18 (shifted), d contacts of relay R6 (normal), d contacts of relay R13 (shifted), and relay R10 to line 307. This relay opens its e contacts in the holding circuit of relay R12, so that the latter becomes deenergized. It closes its a contacts to set up a holding circuit from line 307, relay R10, its a contacts, b contacts of relay R8 (normal), c contacts of relay R12 (normal) to line 306. It also closes its c contacts to later complete a circuit, when relay R18 is deenergized, from line 306, g contacts of relay R18 (normal), wire 327, c contacts of relay R10 (normal), and Pass 2 solenoid 202B to line 307. This solenoid (Fig. 28) swings the B deck skip bar into active position. This circuit is maintained throughout the second pass.

The rack clutch magnet 56 is energized through a circuit traceable from line 306 (Fig. 39b), f contacts of relay R18 (shifted), switch 305, wire 328, d contacts of relay R10 (shifted), wire 329, b contacts or relay R6 (normal) and magnet 56 to line 307. As a result, the machine goes through a card feed cycle in which, however, no card is advanced and the carriage is returned with the card remaining therein. The eject operation is normally suppressed and no circuit is completed through the eject magnet 108 as relay R6 is not energized.

The skip stop tab set in column 1 of deck B (Fig. 38) will cause the card to stop with its first column in punching position in readiness to receive key punching therein. In Fig. 39b, the restoration of the g contacts of relay R18 results in completion of a circuit from line 306, g contacts of relay R18 (normal), wire 322, f contacts of relay R10 (shifted), switch 302 (set at B) and relay R23 to line 307. This relay closes its b contacts in Fig. 39a to connect the magnets 120 of the B deck to the keyboard 36, 37, so that as the keys 10 are now operated the first field of deck B will be punched through circuits similar to those traced for deck A.

Upon stepping of the card to its column 7 position, the skip clip 194 therein will release the carriage for uninterrupted movement to its last column position where relay R18 is again energized with the following results. Relay R8 is energized through a circuit traceable from line 306 (Fig. 39b), g contacts of relay R18 (shifted), d contacts of relay R6 (normal), b contacts of relay R10 (shifted), c contacts of relay R13 (normal), and relay R8 to line 307. It sets up a holding circuit from line 307, relay R8, its a contacts, c contacts of relay R12 to line 306. By opening its b contacts, it breaks the holding circuit to relay R10.

A circuit is established from line 306, f contacts of relay R18 (shifted), wire 328, c contacts of relay R8 (shifted), wire 329, b contacts of relay R3 (normal) and rack clutch magnet 56 to line 307. This again effects a new feed operation and carriage return. The picker action is again suppressed through energization of feed latch magnet 73, through the e contacts of relay R6 (normal) and the g contacts of relay R18 (shifted).

The eject magnet 108 is not energized so the card returns with the carriage.

Magnet 202C is energized through the d contacts of relay R8 (shifted) and g contacts of relay R18 as the carriage returns, so that the skip bar 192 for deck C is shifted into active position and maintained there until the carriage again arrives in its last column position. There is no skip stop clip 194 set in column 1 of the C bar 192, so that the carriage upon release from its returning mechanism immediately advances uninterruptedly to column 24 where a stop clip terminates the advance. Relay R28 (Fig. 39b) will have been energized through a circuit from line 306, g contacts of relay R18 (normal), wire 322, e contacts of relay R8 (shifted), switch 303 and relay R28 to line 307. This relay closes its b contacts in Fig. 39a to connect the punch selecting magnets 120 of deck C to the key contacts 36, 37 so that operation of the keys will cause punching of data in the key punch field of deck C in the now familiar manner.

When the carriage escapes to column 37, the skip clip 194 (Fig. 38) set therein will effect the mechanical release of the carriage and it will skip to its last column position from which it will now be ejected. In Fig. 39 the energization of relay R8 has closed its f contacts so that a circuit is completed upon energization of relay R17 which is traceable from line 306, wire 320, c contacts of relay R18 (normal), d contacts of relay R17 (normal), f contacts of relay R8 (shifted), switch 300, a contacts of relay R15 (normal), relay R6 to line 307. Relay R6 will set up a holding circuit through its a contacts and contacts 111, so that when the carriage arrives in its last column position and relay R18 becomes energized, the relay R6 will be in energized condition. As a result, its e contacts (Fig. 39b) will be shifted to prevent energization of feed latch magnet 73 and a new card will be fed. Relay R16 will also be energized before the card is in last column position through a circuit (Fig. 39b) from line 306, f contacts of relay R18 (normal), wire 315, c contacts of relay R6 (shifted), hopper contacts 264, and relay R16 to line 307. Its a contacts establish the holding circuit through wire 316 and the contacts 111 as before.

Now, when relay R18 is energized, the feed clutch circuit is traceable from line 306, f contacts of relay R18 (shifted), switch 305, wire 318, b contacts of relay R16 (shifted), b contacts of relay R6 (shifted), and magnet 56 to line 307. Thus, a new card will be fed. As before, relay R1 is energized in parallel with magnet 56 and holds through its a contacts and wire 316 along with relay R16. In Fig. 39 the eject magnet 108 is energized through the circuit from line 307, magnet 108, b contacts of relay R18 (shifted), b contacts of relay R1 (shifted), a contacts of relay R6 (shifted) and contacts 111 to line 306. Thus, the eject device is released to eject the punched card and operations will proceed with the new card in the same manner as for the first.

In Fig. 39b, when relay R18 is energized, there is a circuit traceable through its g contacts and the e contacts of relay R6 to energize relay R12 as when operations first commenced. This relay will hold as before, pick up relay R24, and break the holding circuit of relay R8.

The foregoing sets forth the operations that follow automatically through three passes, and it will be apparent that with switch 300 (Fig. 39) set at its 2 position, relay R6 will be energized during the second pass and cause card ejection upon completion of such second pass. Likewise, if switch 300 is set at 1, ejection will occur after the first pass.

In cases where, for example, the controls are set for three passes, the operator may desire to forego key punching in the B and C decks and to have the card eject. This may be done by operating the skip key to close Skip contacts 36, 37 (Fig. 39) whose operation is accompanied by closure of key bail contacts 36, 37. The latter energize the punch magnet 156 to bring about an idle operation during which the punch bail contacts 160 close to complete a circuit from line 306, contacts 160, Skip contacts 36, 37, m contacts of relay R4, c contacts of relay R38, R35 and R32 in series, skip magnet 221 to line 307. The c contacts are provided to prevent skip key operation during the automatic duplicating of data. The skip magnet will release the carriage for advance to its last column position or, if a skip stop tab is encountered, the carriage will stop at such point.

If, when the skip key is depressed, one of the relays R32, R35 or R38 is in energized condition, the circuit from the skip contacts 36, 37 will be diverted to continue through m contacts of relay R4, c contacts of relay R38 (assumed to be shifted), e contacts of relay R14, and auto start magnet 244 to line 307. This magnet closes its contacts 238 to initiate repeated impulses to the punch magnet 156 which continue until a stop tab is encountered on the auto space bar or the card reaches its last column position. An example of the use of the skip key occurs where duplicate and key punching occur in coextensive fields of different decks and where the key punching may vary in number of columns punched. Consider the problem:

Deck B—duplicate columns 1 to 30
Deck A—key punch columns 1 to 30

An auto space stop clip 233 is set in column 51 position. If, say, fifteen columns are key punched (which will be accompanied by duplicate punching in these fifteen columns) and the skip key is then operated, the remaining columns of the field will be automatically spaced in deck A and duplicate punching effected in deck B.

The release key may be depressed during any pass and will initiate the same sequence of operation as explained for starting operations. The result will be to release the card carriage from whatever position it may occupy, eject the card, and feed in a new card. The circuits will automatically readjust themselves so that for the new card operations will recommence with the first or A deck.

In Fig. 39a, the so-called wide card switch 333 when closed will energize relay R22 to invert the connections between key contacts 36, 37 and wires 324 so that the X, Y, Z, 0, 1, 3, 5 keys will direct the circuits to the 5, 3, 1, 0, Z, X, Y wires respectively. This switch is closed when it is desired to punch in the D and E decks of Fig. 38, in which case the cards are placed in the hopper with deck E toward the front of the machine, and the controls are reset for conditions desired in these extra decks, since their punching constitutes an independent operation of the machine and may call for one or two passes. Obviously, with the card so inverted deck C may also be punched as where cards are to receive data in only decks C, D and E and the controls will be set for three passes.

Where manual operation is desired, switch 335 (Fig. 39b) is set to "manual" and the duplicating clip holder is removed from the machine resulting in closure of contacts 247 (Fig. 39), whereupon relay R4 will be energized through contacts 247 and latch contacts 60. The h contacts of this relay R4 short circuit through a and b contacts of relay R12 and the duplicating contacts 238 and 239, so that the circuits to wire 311 are directly from contacts 60, through h contacts of relay R4 to escapement contacts 175 and wire 311, and thence (Fig. 39a) to the key bail and key contacts 36, 37, through the b contacts of relay R14.

The g, e and c contacts of relay R4 (Fig. 39) are connected through wire 331 to wire 326 and the duplicate key contacts 14. Thus, when these contacts are manually closed with the card in any position, they complete a circuit traceable from line 306, contacts 60, wire 310, g contacts of relay R12 (shifted), wires 331, 326, contacts 14, k contacts of relay R4 (shifted), and the auto start relay R14 to line 307. This starts the carriage advancing step by step in the energization of punch magnet 156 through the a contacts of relay R14 (Fig. 39a). In parallel therewith a circuit extends from line 331 and e contacts of relay R18 to energize the star wheel magnet 261 (Fig. 39) so the pattern card is sensed. A third circuit extends from wire 331, through the g, e and c contacts of relay R4 in parallel, the three switches 304 to the three relays R38, R35 and R32 in parallel to line 307. These relays shift their contacts in Fig. 39a so that, as the card is stepped along, all holes in all three decks in the pattern card will be duplicated in the card advanced by the carriage and spacing will continue to the last column position.

When the card is in its last column position and energizes relay R18, ejection and feeding in of a new card is effected by operation of the duplicate key which closes its contacts 14a (Fig. 39b) to energize relay R1 and also magnet 56, the latter through b contacts of relay R6 (shifted). To pick up relay R6 a release key operation must precede this duplicate key operation to first energize relay R15 as explained, which in turn energizes relay R6. Thus, as before with relays R6 and R1 energized (Fig. 39) the eject magnet 108 is energized to effect ejection of the card.

The key restoring magnets 31 (Fig. 39) are energized through a circuit from line 306, contacts 60, wires 310, 309, punch bail contacts 160, d contacts of relay R14, wire 333 and magnets 31 to line 307. They are thus energized for each punch actuation and are also energized directly through the latch contacts 61 which close during the feeding, and thus block key action during such period.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine for perforating a record card having a plurality of multicolumnar decks of data receiving positions, one deck above the other, a row of punches extending over all decks, a row of sensing elements extending over all decks, a carriage supporting a record card and a pattern card prepunched over all decks and movable to cause the record card to traverse the row of punches and the pattern card to traverse the row of sensing elements, mechanism for moving the carriage, a set of character representing keys, devices responsive to the operation of one of said keys for selecting the punches to effect perforations in a column of one of the decks representative of the operated key, further means responsive to the operation of said key to cause operation of the selected punches and devices concurrently controlled by said sensing elements to select punches to effect perforations in the same column of the remaining decks in duplication of data in the corresponding positions in the pattern card, said key causing all selected punches to effect punching concurrently.

2. The invention set forth in claim 1, in which selectively settable control devices are provided to render the key responsive devices effective to cause perforations to be made in any selected one of the decks, whereby operation of a key will cause punching in any deck and the sensing devices will concurrently cause punching in the remaining decks.

3. The invention set forth in claim 1, in which selectively settable control devices are provided to render the sensing elements effective for punching in either one or more of the remaining decks or in none of them.

4. In a record perforating machine having a row of punches, a carriage supporting a record card and movable past said row of punches, mechanism for advancing the carriage, mechanism for returning the carriage, mechanism for ejecting the card from the carriage, control means for effecting repeated successive operation of said advancing and returning mechanisms to reciprocate the card past the row of punches a plurality of times, means effective upon completion of the last advance for automatically rendering the ejecting mechanism effective, and means for presetting said control means to select the number of times the card is to be advanced past the punches and means controlled thereby for effecting operation of said ejecting mechanism prior to ejection thereof.

5. The invention set forth in claim 4 in which the control means includes an escapement device and an automatic space device operated by the carriage for effecting operation of the escapement device to cause step-by-step advance of the carriage for a predetermined extent of its travel.

6. The invention set forth in claim 4 in which the control means includes an escapement device, keys for effecting operating thereof to cause step-by-step advance of the carriage for a predetermined extent of its travel and an automatic space device operated by the carriage for effecting operation of the escapement device to cause step-by-step advance for a further extent of its travel.

7. A carriage escapement device for a record punching machine comprising an escapement rack, a skip bar mounted parallel to said rack, a pair of start and stop interposers carried by the rack to traverse the skip bar, a dog normally biased to engage said rack to hold it against advance, a finger for raising and holding the dog out of engagement wtih the rack to free the rack for a skipping movement, a skip start element positionable on said skip bar and engageable with said start interposers when the carriage is in a selected position, said start interposers causing operation of said finger to raise and hold the dog, a skip stop element positionable on said skip bar, engageable with said stop interposer when the carriage is in a later selected position, said stop interposer causing said finger to release the dog for reengagement with the rack to thereby interrupt the advance thereof, a further device cooperating with the carriage when it reaches its extreme position for causing the finger to raise and hold the dog out of the rack, and means for returning the carriage to its initial position, said further device being effective to hold the finger in skipping position throughout the return of the carriage and prevent its engagement by the dog, whereby the carriage will immediately skip again upon completion of its return movement.

8. A carriage escapement device for a record punching machine comprising an escapement rack, constantly biased in an advancing direction, means for returning the rack, an escapement dog normally biased to engage said rack to hold it against advance, means carried by the rack and effective when the rack is in its extreme advanced position, for disengaging and locking the dog out of the rack during the return movement of the rack, means effective when the rack reaches its extreme return position for unlocking the dog while maintaining it in disengaged position, so that following its return the rack will immediately readvance, and means including a skip bar and an element settable thereon to be traversed by the rack, for causing the dog to reengage the rack when the latter is at a selected point in its advance.

9. In a machine of the class described, a card carriage mounted for reciprocation, means for feeding a card into the carriage, a station, means for automatically reciprocating said carriage to repeatedly feed the card therein past the station, means settable to cause the reciprocating means to operate a selected number of times, and means automatically effective upon completion of the selected number of reciprocations for ejecting the card from the carriage and causing the feeding means to feed a new card thereto.

10. In a machine of the class described, a card hopper, a card carriage mounted for reciprocation, means for feeding cards in succession from the hopper to the carriage, a punching station, means effective upon the feeding of each card to the carriage for causing the carriage to automatically and repeatedly reciprocate past said station a plurality of times, settable means for determining the number of reciprocations to be effected and for controlling the reciprocating means accordingly, and means automatically effective upon completion of the selected number of reciprocations for causing ejection of the card from the carriage.

11. The invention set forth in claim 10 in which key means is provided for superseding control of said settable means and causing ejection of the card after a lesser number of reciprocations than the selected number and for feeding a new card to the carriage upon said ejection.

12. The invention set forth in claim 10 wherein each reciprocation includes an advance and a return stroke of the carriage, escapement mechanism governing said advance stroke, a separate escapement control mechanism for each of the plurality of reciprocations of the carriage, and means controlled by the carriage for rendering the separate control mechanisms selectively effective to each control the escapement mechanism during its related reciprocation of the carriage.

13. In a punching machine, the combination of a punch, an arm pivotally mounted and in engagement with the punch to reciprocate the same upon oscillation of the arm, an interposer pivoted to the arm, said interposer having a slot therein, a restoring bar beneath the arm, an actuating bar connected thereto, means for rocking the interposer into position beneath the actuating bar comprising a bell crank having a fixed pivot and having a pin in one end engaged in said slot in the interposer, arranged so that when the bell crank is rocked the interposer is also rocked through the pin and slot connection and the slot lies parallel to the direction of movement of the punch, and means for reciprocating the said bars whereby on the down stroke the actuating bar forces the interposer down to swing the arm and actuate the punch with said slot sliding on the pin, on the up stroke the actuating bar restores the bell crank by engagement with an arm thereof, the restoring bar restores the interposer upwardly and the coaction between the slot and pin rocks the interposer back to its initial position.

14. The invention set forth in claim 13 in which the actuating bar is mounted to move out of engagement with the bell crank upon completion of its up stroke, whereby the bell crank may be again operated without engaging the bar.

15. In a machine of the class described having a plurality of punch selecting magnets and a punch operating magnet, means for selectively completing circuits to said magnets comprising a plurality of contacts, one for each magnet, a plurality of rockable plates, one for each contact, positioned to form a spaced stack, a plurality of slides arranged along an edge of said stack, each slide having connection with one or more of the plates and adapted to rock the same upon movement of the slide to thereby close the related contacts, a latch pivoted to each slide, a stationary bar normally engaged by the latch to hold it and its slide in an ineffective position, a spring biasing each said slide toward its effective position, and keys, one for each slide, effective to release the related latches to enable movement of the slide by said spring for actuation of the contacts and completion of circuits to said magnets, the slides and contacts being arranged so that each key will cause energization of one or more selecting magnets and the punch operating magnet.

16. In combination, a plurality of slides arranged in a row, there being one slide for each of the letters of the alphabet, a spring on each slide biasing it in one direction, a fixed bar, a latch on each slide engaging said fixed bar to hold the slide against movement by said spring, a plurality of keys, one for each slide, and a connection on each key extending to the related latch constructed so that operation of a key will release the related latch from the fixed bar and enable the related slide to shift under action of its spring, a plurality of contacts less in number than the number of slides, and connections between each slide and the contacts, whereby each slide upon actuation will operate the contacts combinationally to effect a different combination for each key operated.

17. The invention set forth in claim 16 in which a restoring bar is provided for effecting concurrent restoration of the slides and reengagement of the latches with the fixed bar, and magnetic means for operating the restoring bar.

18. In a machine of the class described having a station, a carriage supporting a record card and movable past said station, mechanism for advancing the carriage, mechanism for returning the carriage, mechanism for ejecting the card from the carriage, control means for effecting automatically repeated successive operation of said advancing and returning mechanisms to reciprocate the card past the station a plurality of times, means effective upon completion of the last advance for rendering the ejecting mechanism automatically effective, and means for presetting said control means to select the number of times the card is to be advanced past the station prior to ejection thereof and to cause automatic ejection after the said number of advances.

19. In a record perforating machine, a reciprocating card carriage, a rack fixed to said carriage, means for initiating and effecting a plurality of successive reciprocations of said carriage, each reciprocation including an advance and a return movement thereof, an escapement mechanism engaging said rack for controlling the advance of the carriage, means for actuating said escapement mechanism to cause the carriage to advance with a step-by-step movement, means for disengaging the escapement mechanism from said rack and holding the same out of engagement therewith, said means including a plurality of skip bars provided with elements settable in accordance with different disengaging conditions, and means for automatically causing a different skip bar to control the escapement mechanism for each successive reciprocation of the carriage.

20. In a punching machine having punching mechanism, a card hopper, a card carriage for advancing a card and carrying it completely through the punching mechanism, a card feeding device for feeding a card from the hopper and delivering it directly to the card carriage, means for ejecting the card from the carriage, and means operative when the carriage has advanced the card completely through the punching mechanism for rendering the ejecting mechanism effective to eject the card, for rendering the feeding mechanism effective to feed a new card from the hopper to the carriage, and for returning the carriage to receive the new card, said foregoing operations occurring in automatic sequence, in combination with selectively settable devices for causing the operation of said ejecting and feeding devices to be ineffective for a selected number of successive operations thereof, whereby a card will remain in the carriage for return therewith and readvance through the punching mechanism a plurality of times, and means controlled by said settable devices for restoring the ejecting and feeding devices to effectiveness upon completion of the selected number of operations.

21. In a card punching machine, a set of punches extending across all decks, means for presenting a column of a multideck card thereto, means for sensing a column of a record card and extending over all decks, punch selecting mechanism controlled thereby to select punches for punching in one deck of the card, keys for operating said punch selecting mechanism to select punches for punching in another deck of the card, said pattern card selection being effective upon presentation of the card column to the punches, and said key selection being effective at the will of the operator subsequent to said presentation, and punch operating means rendered effective only through said key operation to concurrently operate the selected punches, whereby pattern and key controlled data will be concurrently punched in the related decks.

22. In a machine for perforating a record card having a plurality of multicolumnar decks of data receiving positions, one deck above the other, a row of punches extending across all decks, a row of sensing elements extending across all decks, means for effecting relative movement between said row of punches and a record card, and for effecting concurrent relative movement between said row of sensing elements and a pattern card to align the punches and sensing elements with the columns of the respective cards, a set of character representing keys, devices responsive to the operation of one of said keys for selecting punches to effect perforations in a column of one of the decks, further means responsive to the operation of said key to cause operation of the selected punches and devices concurrently controlled by said sensing elements to select the punches to effect perforations in the same column of the remaining decks in duplication of data in the corresponding positions in the pattern card, said key causing all selected punches to effect punching.

23. In a record perforating machine: a row of punches, said punches being grouped in a plurality of sets; a record carriage adapted to move a card past said row of punches; a rack associated with said carriage; an escapement mechanism engaging said rack for controlling the movement of said carriage; a skip-lifter for disengaging said mechanism from said rack; a skip-lifter actuating element carried by said carriage and movable therewith along a line parallel with said rack; a plurality of skip bars, each corresponding to one of said punch sets and each being constructed and arranged selectively to operate said actuating element at selected points in its travel, whereby control of said skip-lifter will be in accordance with the selected skip bar; a common holder for said skip bars extending in the direction of movement of said rack and adjacent said line; means for selectively rendering any of said punch sets effective during movement of said carriage; and means controlled by said last-mentioned means for positioning said holder to place the related one of said skip bars into cooperative relationship with said actuating element.

24. In a machine for perforating a record card having a plurality of multicolumnar decks of data receiving positions, one deck above the other, a row of punches extending across all decks, a row of sensing elements extending across all decks, a carriage supporting a record card and a prepunched pattern card and movable to cause the record card to traverse the row of punches and the pattern card to traverse the row of sensing elements, mechanism for moving the carriage, devices controlled by said sensing elements for causing the punches to effect perforations in corresponding columns of the record card as the carriage is moved, a duplicating control bar for each deck of the card, and means separately controlled by each bar for determining for which columns duplicate punching is to be effected in the related deck.

JAMES M. CUNNINGHAM.
ARTHUR F. SMITH.

REFERENCES CITED

The following references are of record in the file of this patent:

UNITED STATES PATENTS

| Number | Name | Date |
| --- | --- | --- |
| 1,790,479 | Lasker | Jan. 27, 1931 |
| 1,851,838 | Hoover | Mar. 29, 1932 |
| 1,867,025 | Pierce | July 12, 1932 |
| 1,962,607 | Maul | June 12, 1934 |
| 1,976,352 | Maul | Oct. 9, 1934 |
| 2,013,543 | Page | Sept. 3, 1935 |
| 2,059,458 | Hosack | Nov. 3, 1936 |
| 2,059,652 | Pott | Nov. 3, 1936 |
| 2,165,237 | Doty | July 11, 1939 |
| 2,168,763 | Daly | Aug. 8, 1939 |
| 2,172,758 | Rice | Sept. 12, 1939 |
| 2,203,355 | Kelley | June 4, 1940 |
| 2,365,189 | Grady | Dec. 19, 1944 |
| 2,408,379 | Day | Oct. 1, 1946 |